US012793483B2

(12) United States Patent
Liu et al.

(10) Patent No.: US 12,793,483 B2
(45) Date of Patent: Nov. 10, 2026

(54) INTELLIGENT DOOR LOCK CONTROL METHOD, RELATED DEVICE AND SYSTEM

(71) Applicant: METIS IP (SUZHOU) LLC, Suzhou (CN)

(72) Inventors: Yuchuan Liu, Beijing (CN); Shuwen Zhou, Beijing (CN)

(73) Assignee: METIS IP (SUZHOU) LLC, Suzhou (CN)

( * ) Notice: Subject to any disclaimer, the term of this patent is extended or adjusted under 35 U.S.C. 154(b) by 0 days.

(21) Appl. No.: 19/060,825

(22) Filed: Feb. 24, 2025

(65) Prior Publication Data

US 2025/0191428 A1 Jun. 12, 2025

Related U.S. Application Data

(62) Division of application No. 17/256,632, filed as application No. PCT/CN2019/093516 on Jun. 28, 2019, now Pat. No. 12,236,734.

(30) Foreign Application Priority Data

Jun. 28, 2018 (CN) ......................... 201810690473.7
Dec. 14, 2018 (CN) ......................... 201811534492.7

(51) Int. Cl.

*G07C 9/00* (2020.01)
*E05B 1/00* (2006.01)
*E05B 17/22* (2006.01)
*E05B 47/00* (2006.01)

(52) U.S. Cl.

CPC ........ *G07C 9/00182* (2013.01); *E05B 1/0007* (2013.01); *E05B 17/22* (2013.01); *E05B 47/0001* (2013.01); *E05Y 2900/132* (2013.01)

(58) Field of Classification Search

CPC ............ G07C 9/00182; G07C 2209/62; G07C 9/00309; E05B 1/0007; E05B 17/22; E05B 47/0001; E05Y 2900/132

USPC ............................................ 340/5.2; 713/168

See application file for complete search history.

(56) References Cited

U.S. PATENT DOCUMENTS

| | | | | | |
|---|---|---|---|---|---|
| 6,032,500 | A * | 3/2000 | Collard, Jr. | E05B 47/0002 | 292/144 |
| 6,178,791 | B1 * | 1/2001 | Hill | E05B 47/0688 | 70/276 |
| 6,658,905 | B1 * | 12/2003 | Hsieh | E05B 47/0012 | 70/279.1 |
| 6,698,263 | B2 * | 3/2004 | Hsieh | E05B 47/026 | 70/108 |

(Continued)

*Primary Examiner* — Nam V Nguyen
(74) *Attorney, Agent, or Firm* — METIS IP LLC

(57) ABSTRACT

Embodiments of the present disclosure disclose an intelligent door lock control method, related device, and system. A user's operation request may be received via a client terminal, and the operation request may be recognized to generate a recognition result. The recognition result may be sent to an intelligent door lock or a server. The intelligent door lock may reach a target state based on the recognition result, and response information of the intelligent door lock may be displayed on the client terminal. In this way, the user can control the intelligent door lock via the client terminal, obtain the real-time status of the intelligent door lock via the client terminal when the user changes the state of the intelligent door lock, thereby improving the user experience.

16 Claims, 16 Drawing Sheets

(56) References Cited

U.S. PATENT DOCUMENTS

| | | | | |
|---|---|---|---|---|
| 7,872,577 | B2 * | 1/2011 | Frolov | E05B 45/06 340/5.32 |
| 9,470,017 | B1 | 10/2016 | Cheng et al. | |
| 9,912,860 | B2 | 3/2018 | Manzari et al. | |
| 9,965,911 | B2 | 5/2018 | Wishne | |
| 10,241,637 | B2 | 3/2019 | Liu et al. | |
| 10,339,293 | B2 | 7/2019 | Yang et al. | |
| 10,565,623 | B2 | 2/2020 | Katz et al. | |
| 11,352,812 | B2 | 6/2022 | Johnson | |
| 12,236,734 | B2 * | 2/2025 | Liu | E05B 17/22 |
| 2014/0365773 | A1 | 12/2014 | Gerhardt et al. | |
| 2019/0264465 | A1 * | 8/2019 | Adje | E05B 47/026 |

* cited by examiner

400

INTELLIGENT DOOR LOCK CONTROL METHOD, RELATED DEVICE AND SYSTEM

CROSS-REFERENCE TO RELATED APPLICATIONS

This application is a division of U.S. patent application Ser. No. 17/256,632, (now U.S. Pat. No. 12,236,734), filed on Dec. 28, 2020, which is a U.S. National stage entry under 35 U.S.C. § 371 of International Application No. PCT/CN2019/093516, filed on Jun. 28, 2019, designating the United States of America, which claims priority to Chinese Patent Application No. 201810690473.7 filed on Jun. 28, 2018 and Chinese Patent Application No. 201811534492.7 filed on Dec. 14, 2018, the contents of each of which are hereby incorporated by reference.

TECHNICAL FIELD

This application relates to the field of control technology, and in particular, to an intelligent door lock control method, equipment, and system.

BACKGROUND

With the increasing popularity of the smart home industry, intelligent door locks are widely used as basic products of smart homes. Intelligent door locks are developed on a basis of traditional mechanical locks. Compared with traditional mechanical locks, the intelligent door locks are more intelligent and simplified in terms of user safety, identification, and management. Users can directly unlock the intelligent door locks by providing verifying information without using a physical key.

Existing door locks usually have a back locking function, and a rear panel is generally equipped with a back locking knob. With the continuous development of door lock technology and in order to facilitate lock assemble, disassemble, and maintenance, it is desired that components of the intelligent door locks can be disassembled conveniently.

Therefore, how to enable a user to perceive an unlocking process and an unlocking result in time, and achieve rapid disassembly and assembly of the back locking knob when the user inputs verification information via an operation panel of an intelligent door lock or when the user encounters interference or interruption has become an important technical issue that person skilled in the art need to be resolved urgently.

SUMMARY

According to the first embodiment of the present disclosure, an intelligent door lock control system is provided. The system may include:

a storage device storing a set of instructions and one or more processors in communication with the storage device, when executing the instructions, the one or more processors may be configured to cause the system to:

receive an operation request including a target state, the target state including at least one of an unlocked state, a locked state, or a back locked state;

generate a processing instruction based on the operation request;

send the processing instruction to the intelligent door lock, the intelligent door lock may be configured to respond to the processing instruction to reach the target state corresponding to the operation request.

In some embodiments, the operation request may be processed by an encryption algorithm. To generate a processing instruction according to the operation request, the one or more processors may be further configured to cause the system to:

decrypt the operation request and generate the processing instruction if the operation request is decrypted successfully.

In some embodiments, the operation request may further include at least one of a key, control authority information of the intelligent door lock, or a random code. To generate a processing instruction according to the operation request, the one or more processors may further be configured to cause the system to:

verify whether the key, control authority information of the intelligent door lock, and/or the random code in the operation request may be consistent with pre-stored information; and in response to determining that the key, control authority information of the intelligent door lock, and/or the random code in the operation request may be consistent with the pre-stored information, and generate the processing instruction.

In some embodiments, the one or more processors may further be configured to cause the system to:

receive state information of the intelligent door lock and state information of the door;

generate, based on the state information of the intelligent door lock and the state information of the door, a processing instruction including a target state, the target state may be at least one of the locked state or the unlocked state;

send the processing instruction to the intelligent door lock.

In some embodiments, the generating a processing instruction based on the state information of the intelligent door lock and the state information of the door, and the one or more processors may further be configured to cause the system to:

in response to determining the intelligent door lock remains in the unlocked state for a first preset time, determine whether the door is locked; in response to determining that the door is locked, generate the processing instruction; in response to determining that the door is unlocked, determining whether the door remains in an unlocked state for a second preset time; and in response to determining that the door is unlocked, determine whether the door remains in the unlocked state for a second preset time, in response to determining that the door remains in the unlocked state for the second preset time, output an alarm message.

In some embodiments, the one or more processors may further be configured to cause the system to:

obtain order data including account information and check-in time information;

generate, based on the order data, a valid key within a preset time period, the preset time period may be associated with the check-in time information;

send the valid key to a client terminal associated with the account information and an intelligent door lock associated with the account information.

In some embodiments, the operation request may include a recognition result from a client terminal, and the recognition result may include information that is obtained by the client terminal by analyzing a user's operation behavior.

In some embodiments, the back locked state may be an electronic back locked state under which all electronic door opening modes and all electronic door opening functions are forbidden.

According to another aspect of the present disclosure, an intelligent door lock control system may be provided.

The system may include a storage device storing a set of instructions;

and one or more processors in communication with the storage device, wherein, when executing the instructions, the one or more processors are configured to cause the system to:

obtain state information of an intelligent door lock;

display the state information on a display area;

receive a user's operation behavior, the operation behavior may be an operation in response to a current state of the intelligent door lock; obtain a recognition result by recognizing the operation behavior, the recognition result may include a target state, the target state may include at least one of an unlocked state, a locked state, or a back locked state;

generate an operation request based on the recognition result, send the operation request to a server and/or the intelligent door lock;

and receive response information of the intelligent door lock and display the response information on the display area.

In some embodiments, to receive a user's operation behavior and obtain a recognition result by recognizing the operation behavior, the one or more processors may further be configured to cause the system to:

detect a sliding direction and information relating to a destination area of the user's operation behavior in a touching area, the touching area may be within the display area;

determine a preset instruction that matches the sliding direction and the client terminal information relating to the destination area as the recognition result, the preset instruction may include at least one of the unlocked state, the locked state, or a back locked state.

In some embodiments, to generate an operation request based on the recognition result, the one or more processors may further be configured to cause the system to:

perform an encryption algorithm on the operation request.

In some embodiments, the operation request may further include at least one of a key, control authority information of the intelligent door lock, or a random code.

According to the second embodiment of the present disclosure, an intelligent door lock may be provided. The intelligent door lock may include a main body and a back locking mechanism mounted inside the main body, wherein the back locking mechanism includes:

a back locking control board configured to receive a processing instruction or an operation request, control a back locking knob component by generating a control signal based on the processing instruction or the operation request, obtain back locking state data, and output the back locking state data;

a back locking detection component configured to obtain the back locking state data by detecting a back locking state;

a back locking knob component configured to realize back locking and operate with the back locking detection component to realize back locking state detection.

In some embodiments, the back locking detection component may include a detection switch and an elastic detection arm, the detection switch may be electronically connected to the back locking control board, and the elastic detection arm may be configured to change state and contact the detection switch through the back locking knob component.

In some embodiments, the back locking knob component may include a back locking knob mechanism installed on the rear panel of the main body of the intelligent door lock, and a back locking knob sleeve installed inside the main body of the intelligent door lock and capable of rotating synchronously with the back locking knob mechanism, the back locking knob sleeve may be provided with a cam portion for squeezing the elastic detection arm and changing the state of the elastic detection arm.

In some embodiments, the elastic detection arm may include an elastic member connected to the inside of the main body of the intelligent door lock; and a roller connected to an end of the elastic member, the roller may be configured to contact the cam portion so that the elastic member changes its state and contacts the detection switch.

In some embodiments, the back locking knob mechanism may include a back locking knob built-in part and a back locking knob;

the back locking knob built-in part may be rotatably installed on the rear panel;

the back locking knob may be detachably installed on the back locking knob built-in part;

and the back locking knob sleeve may be connected to the back locking knob built-in part.

In some embodiments, the rear panel may be provided with an assembly hole, the part of the back locking knob that penetrates the assembly hole may have a circlip groove, and the circlip groove may be fitted with the assembly hole through a circlip, in this way, the back locking knob built-in part may be rotatably installed on the rear panel.

In some embodiments, the intelligent door lock may further comprise a protection mechanism detachably installed on the back locking knob, the protection mechanism may cover the back locking knob and a removable installation structure that matches the back locking knob built-in part.

In some embodiments, the protection mechanism may be detachably installed on the back locking knob through a magnetic attraction structure.

In some embodiments, the protection mechanism may include a magnet, an iron sheet, and a decorative sheet;

the iron sheet may be bonded to the decorative sheet, the back locking knob may have a groove for accommodating the iron sheet and the decorative sheet, and the magnet may be installed in the groove.

In some embodiments, the back locking knob built-in part may be squeezable and installed on the rear panel.

In some embodiments, the back locking knob built-in and the back locking knob may be detachably installed by a screw.

In some embodiment, the back locking knob built-in part may be installed on the rear panel by pressing.

In some embodiments, the intelligent door lock may further comprise a spring, the back locking knob built-in part may have a round shaft for the spring to be sleeved and a pressing part configured to abut one end of the spring, the rear panel may be provided with a round hole groove for accommodating the round shaft and the spring, and the groove bottom of the round hole groove may abut the other end of the spring.

In some embodiments, the groove bottom of the round hole groove may be provided with a gap, a circumferential surface of the round shaft of the back locking knob built-in part may be provided with a bump, and the bump may be configured to be snapped into the gap to limit the rotation of the back locking knob built-in part.

In some embodiment, the rear panel may be provided with a lock screw hole, and a projection of the locking knob built-in part on the rear panel may not block the lock screw hole, the projection of the locking knob installed in the locking knob built-in part on the rear panel may block the lock screw hole.

According to the third embodiment of the present disclosure, an intelligent door lock control method may be provided. The intelligent door lock control method may be implemented by a client terminal, and comprise:

establishing a communication connection with an intelligent door lock; obtaining a current state of an intelligent door lock;

displaying the current state on a display area;

obtaining a recognition result by recognizing the operation instruction if the display area receives an operation instruction, and the operation instruction may represent an operation in response to a current state of the intelligent door lock;

displaying response information on the display area, the response information may be information in response to a target state reached by the intelligent door lock according to the recognition result.

In some embodiments, the recognition result may include an unlocked instruction and a back locked instruction, the obtaining the recognition result by recognizing an operation instruction may comprise:

detecting a sliding direction and information relating to a destination area of the user's operation behavior in a touching area, wherein the touching area may be within the display area;

the sliding direction and the information relating to the destination area of the user's operation behavior may be matched with a preset instruction. If the sliding direction and the information relating to the destination area of the user's operation behavior are matched with the unlocking instruction, the operation instruction may be recognized as an unlocked instruction;

if the sliding direction and the information relating to the destination area of the user's operation behavior are matched with the back locked instruction, the operation instruction may be recognized as a back locked instruction.

According to a fourth embodiment of the present disclosure, an intelligent door lock control method is provided. The intelligent door lock control method may be implemented by a client terminal, and comprise:

establishing a communication connection with a client terminal and an intelligent door lock, respectively;

receiving a recognition result sent by the client terminal, and generating a processing instruction according to the recognition result, the recognition result may be the information obtained by the client terminal according to user's operation instruction;

sending the processing instruction to the intelligent door lock, the intelligent door lock may be configured to respond to the processing instruction to reach a target state corresponding to the user's operation instruction.

In some embodiments, a recognition result may be received from the client terminal, and a processing instruction may be generated according to the recognition result, and comprise:

receiving the recognition result sent by the client terminal, wherein the recognition result may be information obtained by the client terminal according to the user's operation instruction.

verifying the recognition result, if the recognition result matches a preset verification condition, a processing instruction may be generated;

if the recognition result does not match the preset verification condition, failure information may be generated for storage, and the failure information may be sent to the client terminal;

the preset verification condition may include a pre-stored key, control authority information of the intelligent door lock, and random code currently generated by the intelligent door lock.

In some embodiments, if the processing instruction is an unlocking instruction, the intelligent door lock may reach an unlocking state according to the unlocking instruction, comprising:

detecting an opening time of the intelligent door lock;

determining whether the opening time reaches a first preset time threshold; if the opening time reaches a first time threshold, the current state information of the intelligent door lock may be obtained, and the closing of the intelligent door lock may be controlled according to the current state information;

if the opening time does not reach the first time threshold, a determination as to whether the opening time reaches a second preset time threshold may be made; and if the opening time reaches a second time threshold, an alarm message may be generated.

According to the fifth embodiment of the present disclosure, an intelligent door lock method may be provided, and comprise:

establishing a communication connection with a client terminal and a server, respectively;

receiving an operation instruction sent by the client terminal, and generating a recognition result according to the recognition result, the recognition result may be the information obtained by the client terminal according to user's operation instruction;

or receiving a processing instruction sent by the server, and reaching a target state according to the execution of the processing instruction, the processing instruction may be an instruction generated by the server according to a recognition result of the client terminal recognizing the operation instruction, and the target state may be an intelligent door locked state in response to the operation instruction.

According to the sixth embodiment of the present disclosure, a client terminal may be provided. The client terminal may comprise:

a first establishment unit configured to establish a communication connection with an intelligent door lock and obtain a current state of the intelligent door lock;

a first display unit configured to display the current state in a display area;

a recognition unit configured to obtain a recognition result by recognizing the operation instruction if the display area receives an operation instruction, and the operation instruction representing an operation response to the current state of the intelligent door lock;

and a second display unit configured to display response information in the display area, the response information may be information in response to the target state reached by the intelligent door lock according to the recognition result.

According to the seventh embodiment of the present disclosure, a server may be provided. The server may comprise:

a second establishment unit configured to establish a communication connection with the client terminal and the intelligent door lock respectively;

an instruction generation unit configured to receive a recognition result sent from the client terminal to generate a processing instruction according to the recognition result, the recognition result may be the information obtained and recognized by the client terminal according to the user's operation instruction;

and an instruction sending unit configured to send the processing instructions to the intelligent door lock, the intelligent door lock may be configured to respond to the processing instruction to reach a target state corresponding to the operation instruction.

According to the eighth embodiment of the present disclosure, an intelligent door lock control system may be provided. The intelligent door lock system may comprise:

a third establishment unit configured to establish a communication connection with the client terminal and the server respectively;

an instruction verification unit configured to receive an operation instruction of the client terminal and reach a target state according to the verification result by verifying the operation instruction;

or an execution unit configured to receive a processing instruction sent by the server, and execute the processing instruction to reach a target state, the processing instructions may be instructions generated by the server according to a recognition result of the client terminal recognizing the operation instruction, and the target state may be an intelligent door locked state in response to the operation instruction.

According to the ninth embedment of the present disclosure, an intelligent door lock control system may be provided. The system may include a client terminal, a server and an intelligent door lock described above.

BRIEF DESCRIPTION OF THE DRAWINGS

The present disclosure is further illustrated in terms of exemplary embodiments. These exemplary embodiments are described in detail with reference to the drawings. These embodiments are not limiting. In these embodiments, the same number represents the same structure, wherein.

Figure 1:
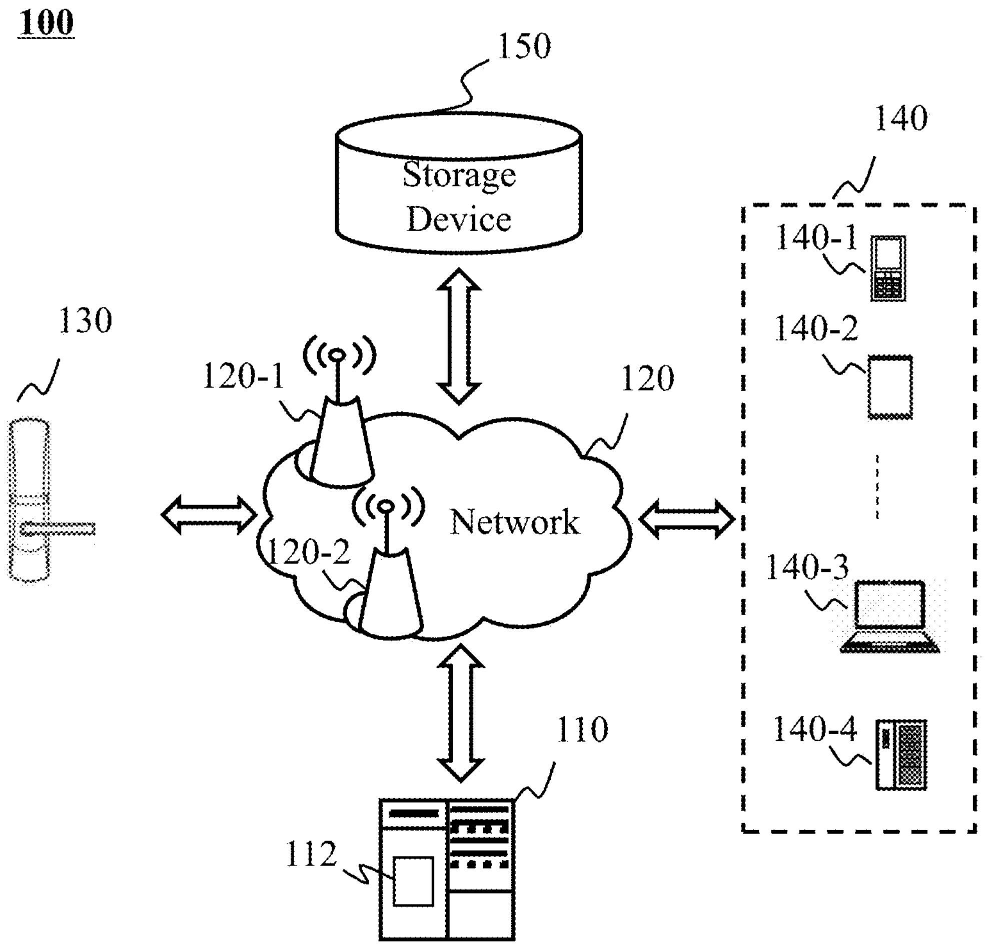
FIG. 1 is a schematic diagram illustrating an intelligent door lock control system according to some embodiments of the present disclosure.

wherein, 1 is a rear panel; 2 is a back locking knob built-in part, 21 is a circlip groove; 22 is a bump; 3 is a back locking knob, 31 is an opening groove; 4 is a magnet; 5 is an iron sheet; 6 is a decorative sheet; 7 is a screw; 8 is a lock screw; 9 is a spring; 10 is a gap; 11 is a circuit board connector; 12 is a back locking control board; 13 is a detection switch; 14 is an elastic detection arm; 15 is a back locking knob sleeve; 151 is a cam portion.

DETAILED DESCRIPTION

In order to illustrate the technical solutions related to the embodiments of the present disclosure, brief introduction of the drawings referred to the description of the embodiments is provided below. Obviously, drawings described below are only some examples or embodiments of the present disclosure. Those having ordinary skills in the art, without further creative efforts, may apply the present disclosure to other similar scenarios according to these drawings. Unless apparent from the locale or otherwise stated, like reference numerals represent similar structures or operation throughout the several views of the drawings.

It will be understood that the term "system," "device," "unit," and/or "module" used herein are one method to distinguish different components, elements, parts, section or assembly of different level in ascending order. However, if other words may achieve the same purpose, the words may be replaced by other expressions.

As used in the disclosure and the appended claims, the singular forms "a," "an," and "the" include plural referents unless the content clearly dictates otherwise. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

One or more flowcharts are used in this application to illustrate the operations performed by the system according to the embodiment of the application. It should be understood that the operations are not necessarily performed exactly in order. Instead, the operations can be processed in reverse order or simultaneously. At the same time, other operations can be added to these processes, or an operation or several operations can be removed from these processes.

With reference to the accompanying drawings and considering the following description, these and other features of the present application and related structural elements, as well as manufactured components and economically combined operation and function methods may become more apparent, and all constitute a part of the present application. However, it should be clearly understood that the drawings are only for illustration and description purposes, and are not intended to limit the scope of the application. It should be understood that the drawings are not to scale.

FIG. 1 is a schematic diagram illustrating an intelligent door lock control system according to some embodiments of the present disclosure.

The intelligent door lock control system 100 may include a server 110, a network 120, an intelligent door lock 130, a client terminal 140, and a storage device 150. In some embodiments, various components in the control system may be connected or communicated with each other through the network 120. For example, the client terminal 140 may establish a communication connection with the server 110 and the intelligent door lock 130, respectively. The server 110 may establish a communication connection with the client terminal 140 and the intelligent door lock 130, respectively. Correspondingly, the intelligent door lock 130 may establish a communication connection with the client terminal 140 and the server 110, respectively. That is, the client terminal 140, the server 110, and the intelligent door lock 130 may be connected to each other for communication, transmission, and reception of data.

In some embodiments, the server 110 may process data and/or information obtained from the intelligent door lock 130, the client terminal 140, and/or the storage device 150. For example, the server 110 may be configured to communicate with the storage device 150 to execute an instruction, receive an operation request, and generate a processing instruction based on the operation request and send the processing instruction to the intelligent door lock 130. The intelligent door lock 130 may respond to the processing instruction to reach a target state corresponding to the operation request. In some embodiments, the operation request may be encrypted, and the server 110 may decrypt the operation request, and the processing instruction may be generated if the operation request is decrypted successfully. In some embodiments, the operation request may further include at least one additional information of a key, control authority information of the intelligent door lock, or a random code. The server 110 itself may pre-store verification information. When the operation request includes additional information, the server 110 may verify whether the key, the control authority information of the intelligent door lock, and/or the random code in the operation request are consistent with the pre-stored verification information to determine whether the operation instruction is legal or valid. In some embodiments, the server 110 may be configured to receive state information of the intelligent door lock and the door, generate a processing instruction based on the state information, and send the processing instruction to the intelligent door lock 130. In some embodiments, the processing instruction may be a target state, such as a locked state or unlocked state.

In some embodiments, the server 110 may be an independent server or a server group. The server group may be centralized or distributed (for example, the server 110 may be a distributed system). In some embodiments, the server 110 may be local or remote. For example, the server 110 may access the information and/or data stored in the intelligent door lock 130, the client terminal 140, and/or the storage device/50 through the network 120. In some embodiments, the server 110 may be directly connected to the intelligent door lock 130, the client terminal 140, and/or the storage device 150 to access the information and/or data stored therein. In some embodiments, the server 110 may be executed on a cloud platform. For example, the cloud platform may include one or any combination of private cloud, public cloud, hybrid cloud, community cloud, decentralized cloud, internal cloud, etc.

In some embodiments, the server 110 may include one or more sub-processing devices (for example, a single-core processor or a multi-core processor). Merely by way of example, the processing device 110 may include a central processing unit (CPU), an application specific integrated circuit (ASIC), an application specific instruction processor (ASIP), a graphics processing unit (GPU), a physical processor (PPU), a digital signal processor (DSP), field programmable gate array (FPGA), programmable logic circuit (PLD), controller, microcontroller unit, reduced instruction set computer (RISC), microprocessor, or the like, or any combination thereof.

The network 120 may facilitate the exchange of information and/or data. In some embodiments, one or more components in the control system 100 (for example, the server 110, the intelligent door lock 130, the client terminal 140, and/or the storage device 150) may send and/or receive information and/or data to/from other components in the control system 100 via the network 120. For example, the server 110 may obtain data/information related to a control state of the intelligent door lock from the intelligent door lock 130 and/or the client terminal 140 via the network 120. As another example, the client terminal 140 may obtain current state information of the intelligent door lock from the server 110 or the storage device 150 via the network 120. In some embodiments, the network 120 may be any form of wired or wireless network or any combination thereof. For example only, the network 120 may include a cable network, a wired network, an optical fiber network, a telecommunication network, an internal network, the Internet, a local area network (LAN), a wide area network (WAN), a wireless local area network (WLAN), a metropolitan area network (MAN), Wide Area Network (WAN), Public Switched Telephone Network (PSTN), Bluetooth Network, Zigbee Network, Near Field Communication (NFC) Network, Global System for Mobile Communications (GSM) Network, Code Division Multiple Access (CDMA) Network, Time Division Multiple Access (TDMA) network, general packet radio service (GPRS) network, enhanced data rate GSM evolution (EDGE) network, wideband code division multiple access (WCDMA) network, high-speed downlink packet access (HSDPA) network, long-term evolution (LTE) Network, User Datagram Protocol (UDP) Network, Transmission Control Protocol/Internet Protocol (TCP/IP) Network, Short Message Service (SMS) Network, Wireless Application Protocol (WAP) Network, Ultra Wideband (UWB) Network, Mobile Communication (1G, 2G, 3G, 4G, 5G) networks, Wi-Fi, Li-Fi, Narrowband Internet of Things (NB-IoT), or the like, or any combination thereof. In some embodiments, the control system 100 may include one or more network access points. For example, the control system 100 may include wired or wireless network access points, such as base stations and/or wireless access points 120-1, 120-2, through which one or more components of the control system 100 may be connected to the network 120 to exchange data and/or information.

The client terminal 140 may be communicated with and/or connected to the server 110 and the intelligent door lock 130. For example, the client terminal 140 may receive an operation request from a user. The operation request may be an instruction to change the state of a door lock or an operation instruction. The operation instruction may include at least one target state of an unlocked state, a locked state, or a back locked state. The client terminal 140 may send a recognition result of the operation instruction to the server 110 or the intelligent door lock 130, and display response information in real time on the display interface. The response information may be target state information of the intelligent door lock 130. In some embodiments, the client terminal 140 may include one or a combination of a mobile device 140-1, a tablet computer 140-2, a notebook computer 140-3, a desktop computer 140-4, or the like. In some embodiments, the mobile device 140-1 may include a smart home device, a wearable device, a smart mobile device, an augmented reality device, or the like, or any combination thereof. In some embodiments, the wearable device may include smart bracelets, smart footwear, smart glasses, smart helmets, smart watches, smart clothes, smart backpacks, smart accessories, or the like, or any combination thereof. In some embodiments, smart mobile devices may include smart phones, personal digital assistants (PDAs), gaming devices, navigation devices, POS machines, or the like, or any combination thereof. In some embodiments, the client terminal 140 may be a device having a positioning technology for locating the location of the client terminal 140. In some embodiments, the client terminal 140 may transmit the collected data/information to the server 110 through the network 120 for subsequent operations. The client terminal 140 may also store the collected data/information in its own storage device, or transmit the collected data/information to the storage device 150 via the network 120. The client terminal 140 may also receive and/or display notifications related to the intelligent door lock 130 generated by the server 110. In some embodiments, various types of data may be collected by multiple client terminals, and preprocessed by one or more of the multiple client terminals. The multiple client terminals may be connected to each other.

The storage device 150 may store data, instructions, and/or any other information. In some embodiments, the storage device may store instructions of the server 110 and the client terminal 140. In some embodiments, the storage device 150 may also store an execution operation and/or a current state of the intelligent door lock 130 (for example, an unlocked state, a back locked state, an open state). In some embodiments, the storage device 150 may store data obtained from the server 110 and/or the client terminal 140. In some embodiments, the storage device may store data and/or instructions executed or used by the server 110 and/or the client terminal 140 to complete exemplary methods described in this application. In some embodiments, the storage device may include a mass storage device, a removable storage device, a volatile read-write memory, read-only memory (ROM), or the like, or any combination thereof. Exemplary mass storage devices may include magnetic disks, optical disks, solid state disks, and the like. Exemplary removable storage devices may include flash drives, floppy disks, optical disks, memory cards, compact disks, magnetic tapes, or the like. Exemplary volatile read-write memory may include random access memory (RAM). Exemplary RAM may include dynamic random access memory (DRAM), double data rate synchronous dynamic random access memory (DDR-SDRAM), static random access memory (SRAM), thyristor random access memory (T-RAM), and zero capacitance Random access memory (Z-RAM), etc. Exemplary read-only memory may include mask-type read-only memory (MROM), programmable read-only memory (PROM), erasable programmable read-only memory (EPROM), electrically erasable programmable read-only memory (EEPROM), CD-ROM and digital versatile disk read-only memory, etc. In some embodiments, the storage device may be implemented on a cloud platform.

It should be noted that the above description is provided for illustrative purposes only, and is not intended to limit the scope of this application. For those of ordinary skilled in the art, various changes and modifications can be made under the guidance of the content of this application. The features, structures, methods, and other features of the exemplary embodiments described in this application may be combined in various ways to obtain additional and/or alternative exemplary embodiments. For example, the storage device may be a data storage device including a cloud computing platform, such as public cloud, private cloud, community, and hybrid cloud. However, these changes and modifications may not depart from the scope of this application.

Some embodiments of the present application also provide an intelligent door lock control system. The system may at least include a storage device and a processor. The storage device may be configured to store at least one set of instructions. The processor may be configured to communicate with the storage device to execute the instructions to receive an operation request, generate a processing instruction based on the operation request, and send the processing instruction to the intelligent door lock. The intelligent door lock may respond to the instruction to reach the target state corresponding to the operation request. In some embodiments, there may be one or more processors.

In some embodiments, the operation request may be encrypted, the processor may decrypt the operation request, and the processing instruction may be generated only after the operation request is decrypted successfully.

In some embodiments, the operation request may further include at least one additional information of a key, control authority information of the intelligent door lock, or a random code. The processor may pre-store verification information. When the operation request includes the additional information, the processor may also verify whether the additional information of the operation request is consistent with the pre-stored verification information to determine whether the operation instruction is legal or valid. In some embodiments, the processor may also be configured to receive state information of the intelligent door lock and the state information of the door, and generate a processing instruction based on the state information of the intelligent door lock and the state information of the door to send to the intelligent door lock. The processing instruction may include a target state, such as an unlocked state or a locked state.

Figure 2:
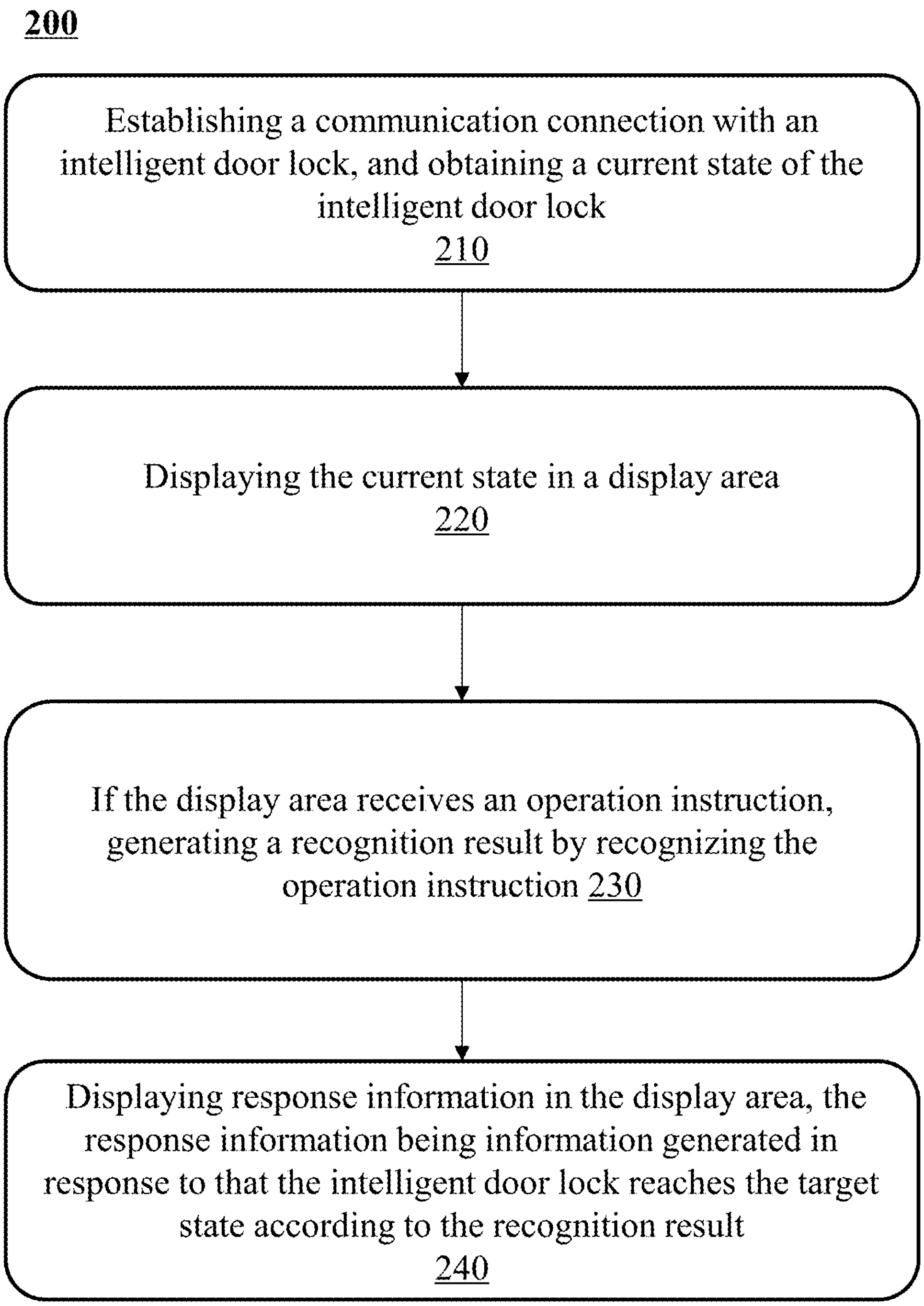
FIG. 2 is a schematic flowchart illustrating an intelligent door lock control method according to some embodiments of the present disclosure.

FIG. 2 is a schematic flowchart illustrating an intelligent door lock control method according to some embodiments of the present disclosure, which is implemented by a client terminal. Specifically, the intelligent door lock control method 200 may be executed by a processing device. For example, the intelligent door lock control method 200 may be stored in a storage device in the form of a program or an instruction. When the intelligent door lock control system 100 (such as a processing device) executes the program or the instruction, the intelligent door lock control method 200 may be implemented. As shown in FIG. 2, the intelligent door lock control method 200 may include the following operations:

Operation 210, establishing a communication connection with an intelligent door lock, and obtain a current state of the intelligent door lock.

In some embodiments, the client terminal may be a mobile terminal, such as a mobile phone, a tablet computer, etc. When the client terminal establishes a communication connection with the intelligent door lock, the connection mode may be any one of Bluetooth, WIFI, GPRS, 2G, 3G, 4G and RFID. A user may be provided with a variety of options for wireless connection. The user may connect the client terminal to the intelligent door lock via WIFI or GPRS in real time when there is a network. If there is no network, the user may connect the client terminal to the intelligent door lock via Bluetooth or RFID.

After the communication connection between the client terminal and the intelligent door lock is established successfully, the current state of the intelligent door lock may be obtained. The current state may correspond to a locked state or an unlocked state of the intelligent door lock, for example, including a locked state of the intelligent door lock. The locked state may include a normal locked state and a back locked state. In some embodiments, the back locked state may be an electronic back locked state that shields all electronic door opening methods and disables all electronic door opening functions. In the electronic back locked state, all electronic door opening methods and functions may be invalid or shielded, and electronic door opening may not be realized. In some embodiments, exemplary electronic door opening modes may include non-mechanical door opening methods, such as door opening methods using fingerprints, passwords, and Bluetooth keys. In some embodiments, the electronic door opening methods may include a short-distance door opening method and a remote door opening method. The short-distance door opening method may include non-mechanical door opening methods, such as door open methods using biometric recognition (for example, voice recognition, fingerprint recognition, eye recognition, facial recognition, etc.), passwords, user identification, or account recognition. The remote door opening method may include non-mechanical door opening methods, such as door opening methods using a voice call, a remote control button, a Bluetooth key, etc.

Operation 220: displaying the current state in a display area.

After the current state of the intelligent door lock is obtained, the client terminal may display the current state on a corresponding display area of the client terminal. On the one hand, it may be convenient for the user to view or obtain the state of the door lock in real time through the client terminal. On the other hand, it may be convenient to determine how to control the intelligent door lock based on the current state.

Operation 230: If the display area receives an operation instruction, a recognition result may be generated by recognizing the operation instruction. The operation instruction may be indicative of an operation in response to the current state of the intelligent door lock.

An operation area may be set in the display area of the client terminal to facilitate the user to determine a corresponding operation based on the current state, and the operation area may receive the user's operation instruction. When the user's operation instruction is received via the display area, the operation instruction may be recognized to obtain the recognition result, so that the client terminal can recognize the purpose of the operation instruction, that is, a desired target state of the intelligent door lock.

Regarding the current state of the intelligent door lock, the recognition result may include an unlocked instruction and a back locked instruction. In another embodiment of the present invention, a method for recognizing an operation instruction is provided. The method may include detecting a sliding direction and information relating to a destination area of the user's operation behavior in a touching area, wherein the touching area may be within the display area. The sliding direction and the information relating to the destination area of the user's operation behavior may be matched with a preset instruction. If the sliding direction and the information relating to the destination area of the user's operation behavior are matched with the unlocking instruction, the operation instruction may be recognized as an unlocked instruction. If the sliding direction and the information relating to the destination area of the user's operation behavior are matched with the back locked instruction, the operation instruction may be recognized as a back locked instruction.

Figure 3:
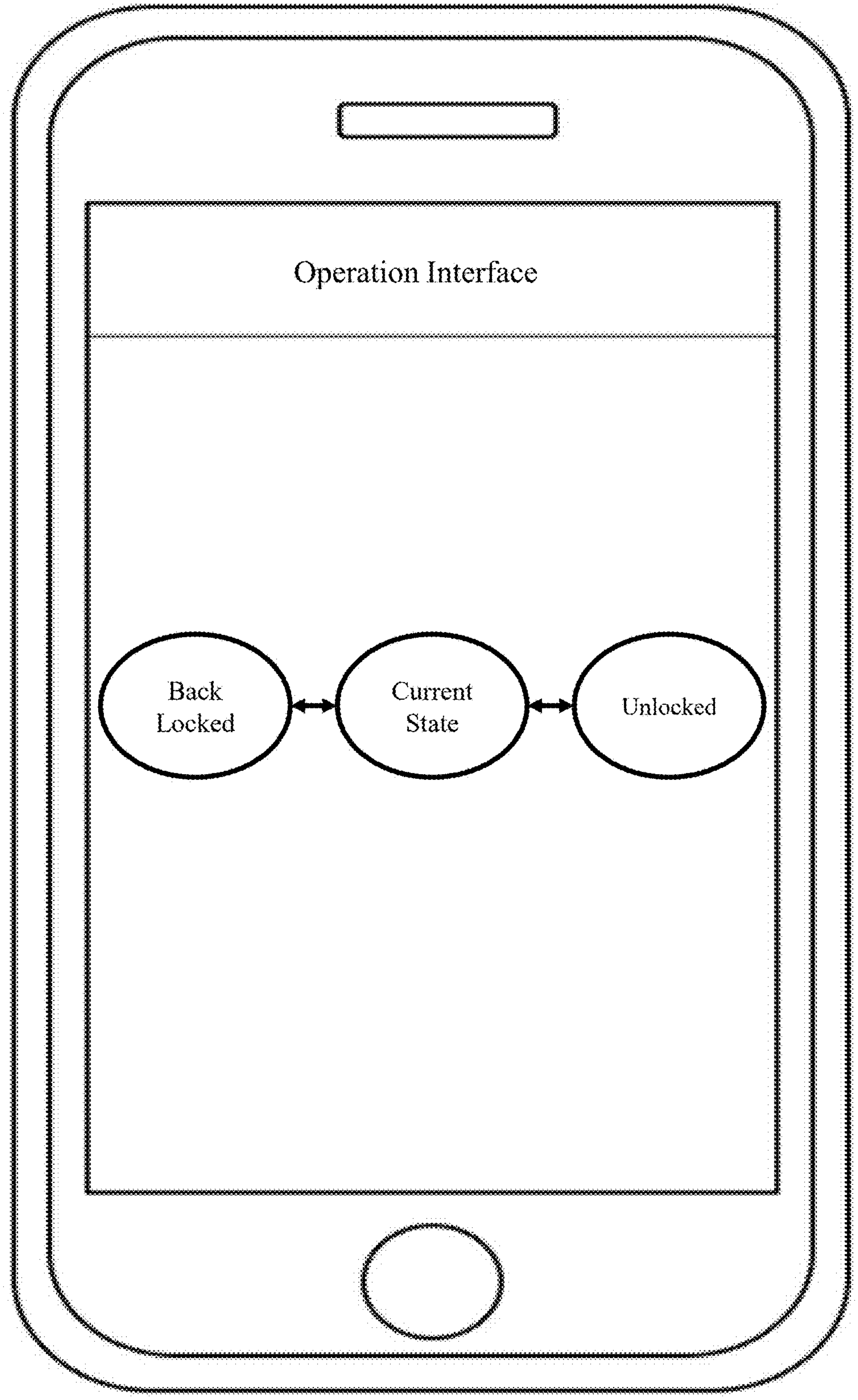
FIG. 3 is a schematic diagram illustrating a display interface of a client terminal according to some embodiments of the present disclosure.

Referring to FIG. 3, FIG. 3 is a schematic diagram illustrating a display interface of a client terminal according to some embodiments of the present application. For example, when a touch-sensitive display of the client terminal displays a user interface, i.e., a display interface, the client terminal may first detect a user's contact with the touch-sensitive display. When the detected contact is located in the "current state area" of the display interface, that is, an initial touch point of the user is detected and the user's sliding direction and destination area are both in the "unlocked" area, the corresponding operation instruction may be determined as an unlocked instruction. The unlocked instruction may be sent to the intelligent door lock or the server. Correspondingly, when the user's sliding direction and destination area are both in the "back locked" area, the corresponding operation instruction may be determined as a back locked instruction.

The operation instruction may be an unlocked instruction or a back locked instruction, which may be used to realize the unlocking or the back locking of the intelligent door lock. In this way, a problem that existing intelligent door lock systems can only perform a back locking operation within doors, and the security of the intelligent door lock and the user experience may be improved.

Operation 240: response information may be displayed in the display area. The response information may be information generated in response to that the intelligent door lock reaches the target state according to the recognition result.

After the intelligent door lock reaches the target state according to the operation instruction, corresponding response information may be displayed in the display area of the client terminal. For example, if the current state of the intelligent door lock is locked, and the operation instruction is an unlocking instruction, the response information may be that the door lock is unlocked. In this way, it may be convenient for the user to understand the state information of the intelligent door lock in real time, and understand the operation process and state in time.

It should be noted that when the intelligent door lock control method is implemented by the client terminal, the method may further include: establishing a communication connection with the server; sending a recognition result to the server; and displaying response information on a display area, wherein the response information may be information generated in response to that the intelligent door lock reaches a target state according to a processing instruction sent by the server, and the processing instruction may be an instruction generated by the server according to the recognition result. That is, the client terminal may directly send the recognition result to the intelligent door lock, and the intelligent door lock may perform a corresponding operation according to the recognition result to reach the target state. Alternatively, the client terminal may send the recognition result to the server, the server may generate the processing instruction according to the recognition result and send the processing instruction to the intelligent door lock, and the intelligent door lock may reach the target state according to the processing instruction.

It should be noted that the above process 200 and its description are provided for illustrative purposes only, and are not intended to limit the scope of this application. For those of ordinary skilled in the art, various modifications and changes can be made based on the description of this application. However, these amendments and changes will not depart from the scope of this application.

Figure 4:
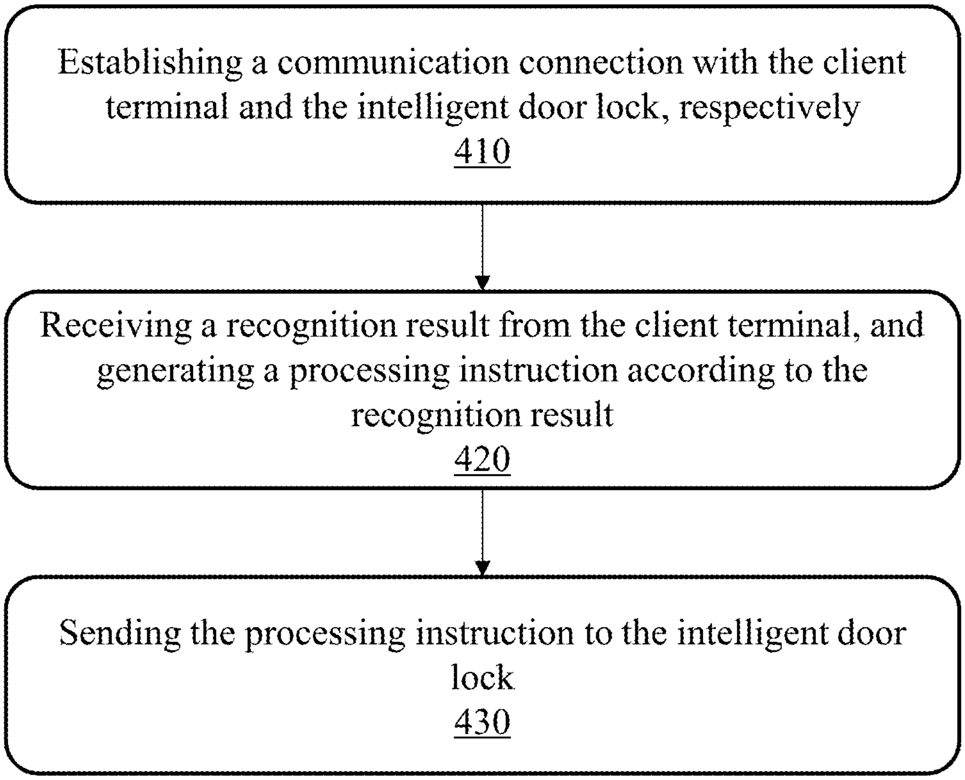
FIG. 4 is a schematic flowchart illustrating another intelligent door lock control method according to some embodiments of the present disclosure.

FIG. 4 is a schematic flowchart illustrating another intelligent door lock control method according to some embodiments of the present disclosure, which is implemented by a server. As shown in FIG. 4, the intelligent door lock control method 400 may include the following operations:

Operation 410: a communication connection with the client terminal and a communication connection with the intelligent door lock may be established, respectively.

In some embodiments, the server may be connected to the client terminal and the intelligent door lock through a connection method, such as Bluetooth, WIFI, GPRS, 2G, 3G, 4G, and/or RFID.

Operation 420: a recognition result may be received from the client terminal, and a processing instruction may be generated according to the recognition result. The recognition result may be information obtained by the client terminal by recognizing a user's operation instruction.

After the server has established a communication connection with the client terminal, the server may receive the recognition result sent by the client terminal, and generate a processing instruction for the intelligent door lock according to the recognition result. To ensure the safety of the intelligent door lock, the recognition result sent by the client terminal may be verified. Specifically, another embodiment of the present disclosure provides a method for generating a processing instruction.

The method for generating a processing instruction may include receiving the recognition result sent by the client terminal, wherein the recognition result may be information obtained by the client terminal according to the user's operation instruction. The method for generating a processing instruction may also include verifying the recognition result. If the recognition result matches a preset verification condition, a processing instruction may be generated. If the recognition result does not match the preset verification condition, failure information may be generated for storage, and the failure information may be sent to the client terminal. The preset verification condition may include a pre-stored key, control authority information of the intelligent door lock, and random code currently generated by the intelligent door lock.

The recognition result may be deemed as matching the preset condition if the following three conditions are met: a key included in the recognition result matches the pre-stored key; and/or authority information included in the recognition result matches the control authority information of the intelligent door lock; and/or a random code included in the recognition result matches the random code currently generated by the intelligent door lock. As long as one or all of the above conditions are met, the server may generate a processing instruction. The random code may be randomly generated. In some embodiments, the random code may also be generated by the intelligent door lock or the client terminal. If the operation instruction is an encrypted operation instruction, the encrypted operation instruction may need to be decrypted first to obtain an unencrypted operation instruction. If the recognition result does not match the preset conditions, the failure information may be generated for storage, which facilitates the retrieval and analysis of the failure information.

Operation 430: the processing instruction may be sent to the intelligent door lock. The intelligent door lock may be configured to respond to the processing instruction to reach a target state matching the user's operation instruction.

To improve the security of the intelligent door lock, some embodiments of the present disclosure also provide a method for monitoring the unlocked state of the intelligent door lock. If the processing instruction is an unlocking instruction, the intelligent door lock may reach an unlocking state according to the unlocking instruction, and the method may also include:

detecting an opening time of the intelligent door lock; determining whether the opening time reaches a first preset time threshold; if the opening time reaches the first time threshold the current state information of the intelligent door lock may be obtained, and the closing of the intelligent door lock may be controlled according to the current state information; if the opening time does not reach the first time threshold, a determination as to whether the opening time reaches a second preset time threshold may be made; and if the opening time reaches the second time threshold, an alarm message may be generated. By setting the preset time thresholds, the security state of the intelligent door lock after it is opened may be improved. For example, if the opened door lock is not detected closed for a long time, an alarm message may be generated to notify the user or a corresponding service system to improve security.

At the same time, in some embodiments, another method for monitoring the unlocking state of the intelligent door lock is provided, specifically: if the processing instruction is an unlocking instruction, the intelligent door lock may reach an unlocking state according to the unlocking instruction, and the method may also include: generating a processing instruction based on the state information of the intelligent door lock and the state information of the door, and the one or more processors may further be configured to cause the system to: if the state of the intelligent door lock is opened for a first preset time, determine whether the state of the door is locked: in response to the state of the door is locked, the processing instruction may be generated, and in response to the state of the door is unlocked, determine whether the state of the door is open for a second preset time; if the state of the door is open for the second preset time, alarm information may be output.

In some embodiments, the state of the door may be detected by setting an angle sensor on a rotation axis of the door to detect a rotation angle of the axis, thereby obtaining a rotation angle of the door and detecting the opening and closing of the door based on the rotation angle of the door. In some embodiments, the state of the door may be detected by an infrared sensor provided on the door or the door frame. The infrared sensor may be configured to detect the distance between the door and the door frame to determine the opening and closing of the door. In some embodiments, the state of the door may be detected by a contact sensor provided in a lock tongue on the door or a lock catch on the door frame. The opening and closing of the door may be detected based on a determination result as to whether the lock tongue is in contact with the contact sensor, or whether the contact sensor is in contact with an internal structure of the door frame.

In another embodiment of the present disclosure, an account information detection method is also provided, which includes: detecting whether the client terminal's account information matches originally stored account information; and if the client terminal's account information matches the originally stored account information, the processing device may receive the operation instruction sent by client terminal; if the client terminal's account information does not match the originally stored account information, the processing device may generate a target key according to the client terminal's account information, and send the target key to the intelligent door lock.

After the client terminal's account information is changed, the server may resend a key generated based on the changed account information to the intelligent door lock. The change of the account information mainly refers to the change of account authentication information, login information, etc. For example, if the user uses a new mobile phone to log in, the account information may be changed, the login password may be reset, the account identification may expire, and the door lock information may be changed, such as the door lock is rebound, the door lock key is not available, and the door lock is reset, etc.

It should be noted that the above process 400 and its description are provided for illustrative purposes only, and are not intended to limit the scope of this application. For those of ordinary skilled in the art, various modifications and changes can be made based on the description of this application. However, these amendments and changes will not depart from the scope of this application.

Figure 5:
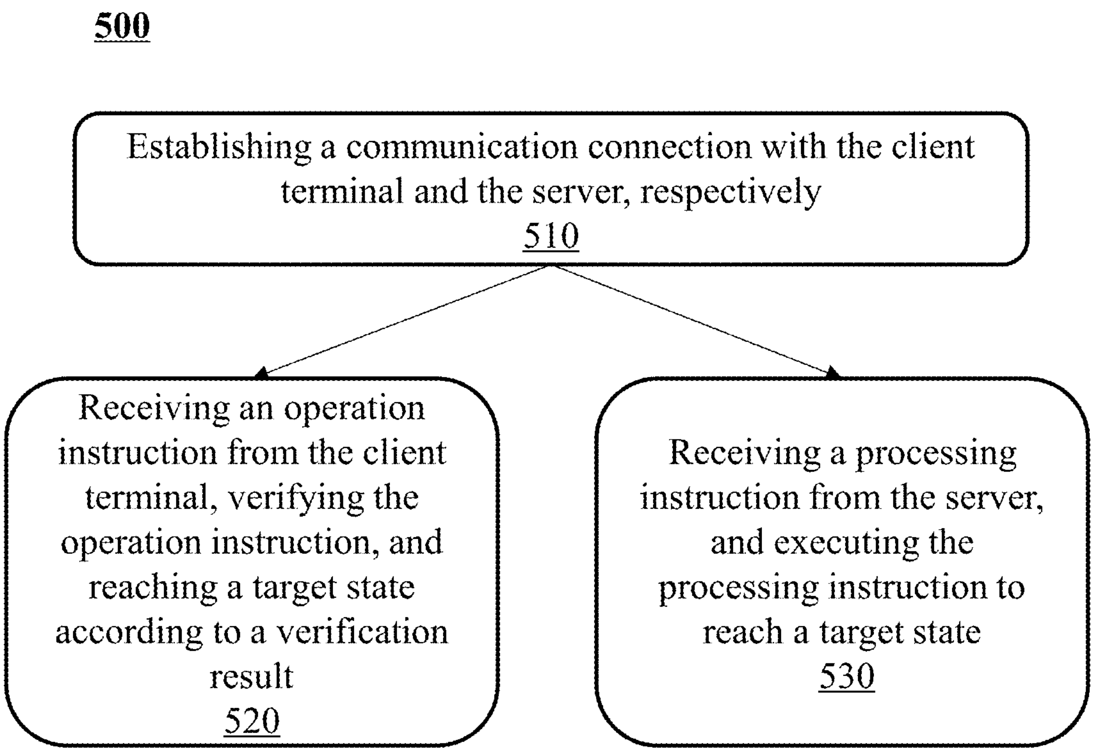
FIG. 5 is a schematic flowchart illustrating another intelligent door lock control method according to some embodiments of the present disclosure.

FIG. 5 is a schematic flowchart illustrating another intelligent door lock control method according to some embodiments of the present application, which is applied to an intelligent door lock. As shown in FIG. 5, the intelligent door lock control method 500 may include the following operations:

Operation 510: establishing a communication connection with the client terminal and the server, respectively.

In some embodiments, the server may be connected to the client terminal and the intelligent door lock through a connection method such as Bluetooth, WIFI, GPRS, 2G, 3G, 4G, and/or RFID.

Operation 520: receiving an operation instruction from the client terminal, and verifying the operation instruction, and reaching a target state according to a verification result.

Alternatively, operation 530: receiving a processing instruction sent by the server, and executing the processing instruction to reach a target state. The processing instruction may be an instruction generated by the server according to a recognition result of the client terminal with respect to the operation instruction, and the target state may be a state of the intelligent door lock in response to the operation instruction.

In some embodiments, the intelligent door lock may directly receive the operation instruction from the client terminal. Alternatively, the intelligent door lock may receive the operation instruction from the server, and the received instruction may be a processing instruction of the operation instruction generated by the server.

If the intelligent door lock directly receives the operation instruction from the client terminal, the operation instruction may need to be verified. For example, whether a key included in the operation instruction matches an existing key may be determined; whether a sender of the operation instruction has an authority to unlock or back lock the door may be determined; whether the random code of the operation instruction is a valid random code newly generated by the intelligent door lock may be determined.

Merely by way of example, the intelligent door lock of the present disclosure may open the door in two ways: the client terminal may send an encrypted operation instruction to a corresponding intelligent door lock. The intelligent door lock may parse the encrypted operation instruction, and match the parsed operation instruction (i.e. unlocking or back locking information) with operation instructions currently stored in the door lock. In response to determining that the parsed operation instruction matches the currently stored operation instruction successfully, the door may be unlocked or back locked successfully. The other way is that the client terminal sends the encrypted operation instruction to the server, and the server may parse the operation instruction to obtain information, such as a user account and an operation instruction (i.e. unlocking or unlocking information). The server may retrieve related intelligent door lock information from a database according to the parsed user account and other information, and send the parsed result of the operation instruction to the corresponding intelligent door lock. The intelligent door lock may match the received parsed result with the existing operation instruction information of the door lock. In response to determining that the parsed result matches the currently stored operation instructions successfully, the door may be unlocked or back locked successfully, and in response to determining that the parsed result does not match the currently stored operation instructions successfully, the door may not be unlocked or back locked.

That is, the parsing process of the operation instruction may be implemented by the intelligent door lock or the server, preferably on the server, and then the operation instruction may be matched to the corresponding intelligent door lock through the server, which is convenient for the server to store operation data of the intelligent door lock, and the monitor and manage the intelligent door lock.

The intelligent door lock control method provided by the present disclosure may include receiving an operation instruction from a user via the client terminal, obtaining a recognition result by recognizing the operation instruction, and sending the recognition result to the intelligent door lock or the server. The intelligent door lock may reach a target state based on the recognition result, and the response information of the intelligent door lock state may be displayed on the client terminal. In this way, the user can control the intelligent door lock via the client terminal, and obtain a real-time state of the intelligent door lock through the client terminal when the user changes the state of the intelligent door lock, which improves the user experience.

The embodiments of the present invention will be described below in conjunction with specific application scenarios when the intelligent door lock control method provided by the present invention is applied to hotels or rental apartments, etc. Between a check-in time of a user and a time when the user leaves the hotel (i.e., within a valid check-in time period of the user), the intelligent door lock control method may be implemented and information may be presented on a touch-sensitive display screen of the user's mobile terminal via an APP, a WeChat public account, or a mini program, and the user can open or lock the intelligent door lock through a unlocking interface displayed on the display screen. The information displayed on the unlocking interface may include information, such as an apartment or hotel name, the check-in time, room information, information of the intelligent door lock, etc. During the user's check-in period, an operating area in the unlocking interface may be in a touchable state, otherwise in a non-touchable state. Referring to FIG. 3, when the user slides the circular "current state" to the unlocking or unlocking area, an encrypted operation instruction may be sent to the intelligent door lock via a wireless network. After receiving the encrypted operation instruction, the corresponding intelligent door lock may decrypt the operation instruction and compare the operation instruction with a key, an authority, and a random code stored in the intelligent door lock. If the operation instruction matches the key, the authority, and the random code, the intelligent door lock may respond to the operation instruction. If the operation instruction dismatches any one of the key, the authority, and the random code, the intelligent door lock may send a warning message. It should be noted that matching information can be set according to actual application scenarios or requirements, and only the most general situation is described here.

The user may use a start touching area, a sliding direction, and a stop area to determine a corresponding operation via the mobile terminal, which can provide the user a procedural experience and further enhance the user experience.

When the user's mobile terminal has a problem or the intelligent door lock breaks down, the user can request a new key via the mobile terminal, and the server or the mobile terminal may re-issue an updated key to the intelligent door lock.

When the user's check-in order is changed, the unlocked key may be changed in a timely manner to improve the security and the user experience.

As another example, after the user places an order through a hotel webpage on a computer, the hotel's system may receive a check-in order and determine an order state of the check-in order. When the determination result is that the order has been paid and the order is not checked in, the hotel's system may confirm that the order is within a validity period and send an order confirmation instruction to the server.

The server may generate a key after receiving the order confirmation instruction. It should be noted that when an authorized operator confirms the order information through an input device of the server, the server may also generate a corresponding key according to the order information.

The server may send the key to the intelligent door lock. After receiving the key, the intelligent door lock may store the key in a main body and encrypt all operation instructions. The server may send the key to a user's client terminal, that is, the server may send the key to the intelligent door lock of a corresponding room according to a room number in the order information. The server may not send the key to the mobile terminal (e.g., a mobile phone) of a corresponding user according to account information or phone information in the order information.

When the user checks in and needs to enter a reserved room, the user's mobile terminal may encrypt the operation instruction, and send an encrypted operation instruction to the intelligent door lock of the room. The intelligent door lock may decrypt the encrypted operation instruction, obtain an unlocking instruction, and compare the unlocking instruction with the main body's key, authority, and random code. If the unlocking instruction matches the main body's key, authority, and random code, the door may open and a successful message may be returned to the user's client terminal. If the unlocking instruction does not match the main body's key, authority, or random code, the door may fail to be opened, and a failure message may be returned to the client terminal.

After the intelligent door lock is successfully unlocked, in addition to sending the successful message to the client terminal, a door unlocked record may be generated and pushed to the server.

After the intelligent door lock is back locked successfully, the intelligent door lock may shield (i.e., invalid) all electronic door opening methods, and return a back locked successful message to the user's client terminal to prompt the user that the back locking is successful.

Therefore, the user can realize the unlocking or unlocking operation of the intelligent door lock through the client terminal, such as the mobile phone. The user may clearly perceive an unlocking or unlocking process through the client terminal, i.e., an interactive process between the mobile phone and the door lock. The user can be informed in time when the unlocking or unlocking fails, and the user experience can be further improved by requesting unlocking or unlocking again.

Figure 6:
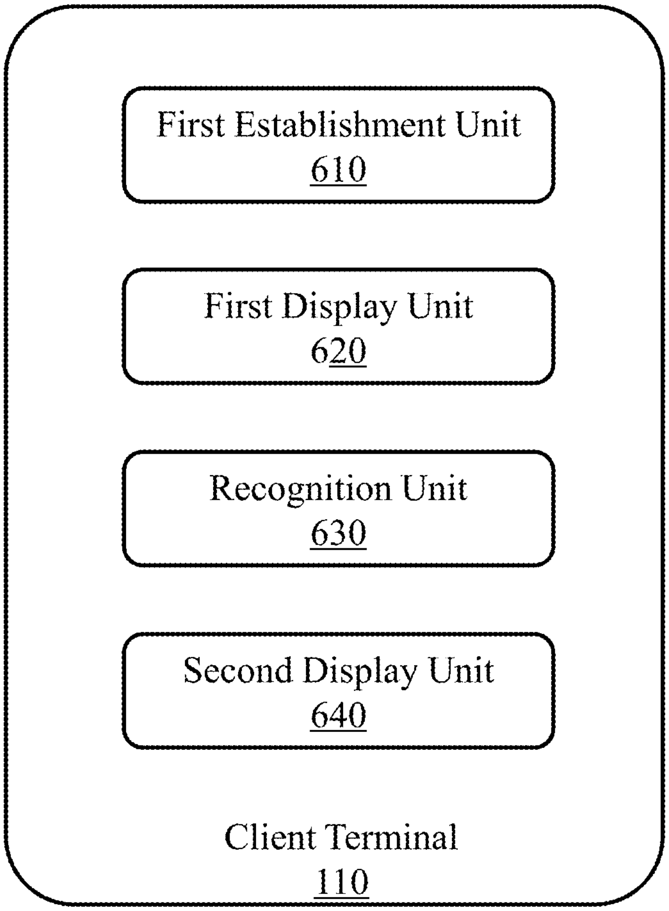
FIG. 6 is a structural diagram of a client terminal according to some embodiments of the present disclosure.

FIG. 6 is a structural diagram illustrating a client terminal according to some embodiments of the present disclosure. As shown in FIG. 6, the client terminal 140 may include a first establishment unit 610, a first display unit 620, a recognition unit 630, and a second display unit 640.

The first establishment unit 610 may be configured to establish a communication connection with an intelligent door lock and obtain a current state of the intelligent door lock.

The first display unit 620 may be configured to display the current state in a display area.

The recognition unit 630 may be configured to obtain a recognition result by recognizing an operation instruction if the display area receives an operation instruction, and the operation instruction may represent an operation in response to the current state of the intelligent door lock.

The second display unit 640 may be configured to display response information in the display area. The response information may be information generated in response to that the intelligent door lock reaches the target state according to the recognition result.

Figure 7:
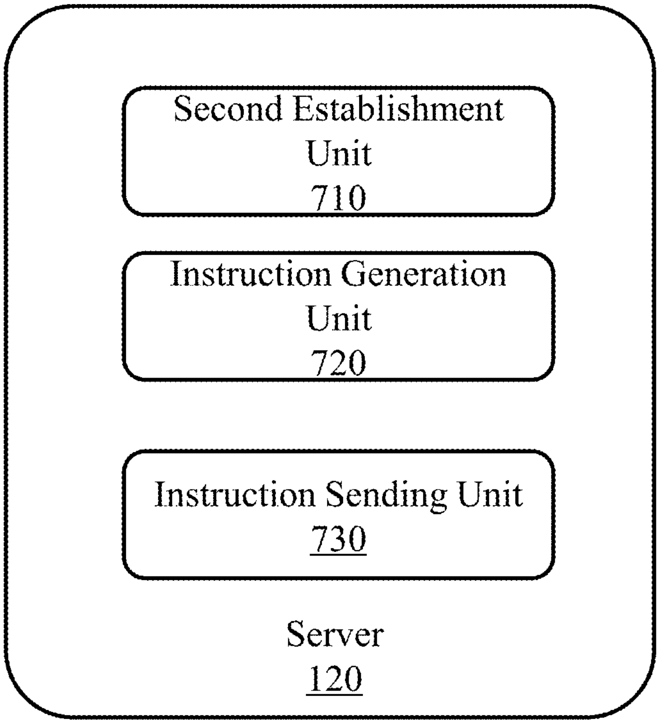
FIG. 7 is a structural diagram of a server according to some embodiments of the present disclosure.

FIG. 7 is a structural diagram of a server according to some embodiments of the present disclosure. As shown in FIG. 7, the server 110 may include a second establishment unit 710, an instruction generation unit 720, and an instruction sending unit 730.

The second establishment unit 710 may be configured to establish a communication connection with the client terminal and the intelligent door lock, respectively.

The instruction generation unit 720 may be configured to receive a recognition result from the client terminal, and generate a processing instruction according to the recognition result. The recognition result may be information obtained and recognized by the client terminal according to a user's operation instruction.

The instruction sending unit 730 may be configured to send the processing instruction to the intelligent door lock. The intelligent door lock may be configured to respond to the processing instruction to reach a target state corresponding to the operation instruction.

Figure 8:
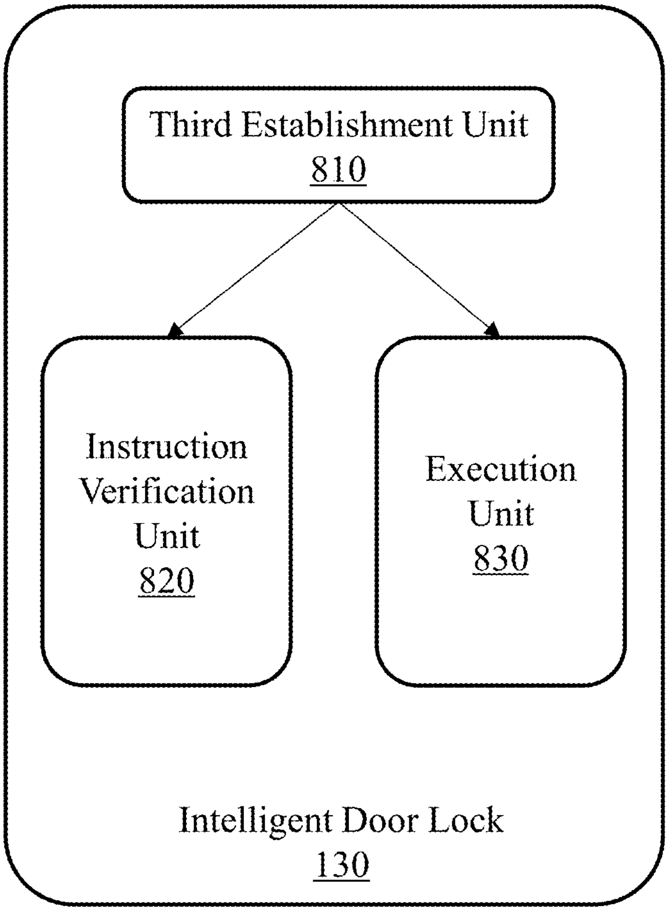
FIG. 8 is a structural diagram illustrating an intelligent door lock control system according to some embodiments of the present disclosure.

FIG. 8 is a structural diagram illustrating an intelligent door lock control system according to some embodiments of the present application. As shown in FIG. 8, the intelligent door lock control system 130 may include a third establishment unit 810, an instruction verification unit 820, and an execution unit 830.

The third establishment unit 810 may be configured to establish a communication connection with the client terminal and the server, respectively.

The instruction verification unit 820 may be configured to receive an operation instruction from the client terminal, and reach a target state according to the verification result by verifying the operation instruction.

Alternatively, the execution unit 830 may be configured to receive a processing instruction sent by the server, and execute the processing instruction to reach the target state. The processing instruction may be an operation instruction that is generated by the server according to a recognition result of the client terminal with respect to the operation instruction, and the target state may be an intelligent door locked state in response to the operation instruction.

Figure 9:
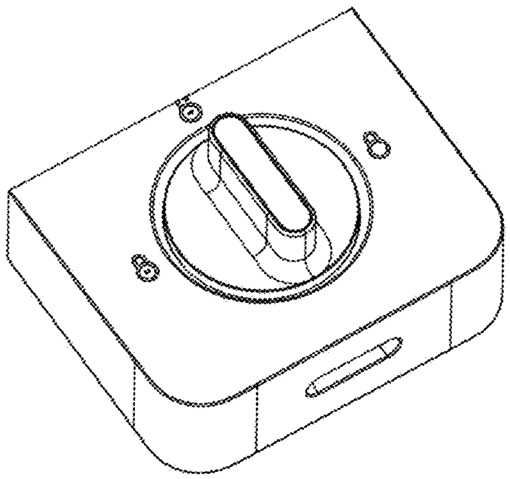
FIG. 9 is a first structural diagram illustrating a back locking mechanism according to some embodiments of the present disclosure.
Figure 10:
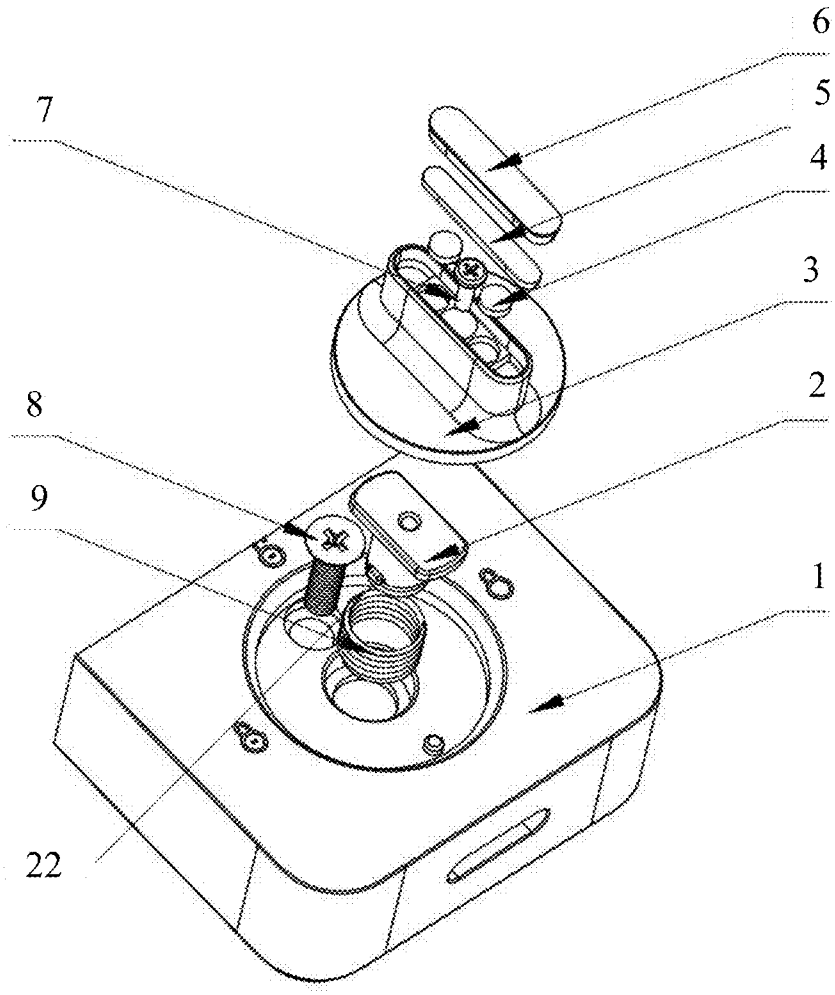
FIG. 10 is a second structural diagram illustrating a back locking mechanism according to some embodiments of the present disclosure.
Figure 11:
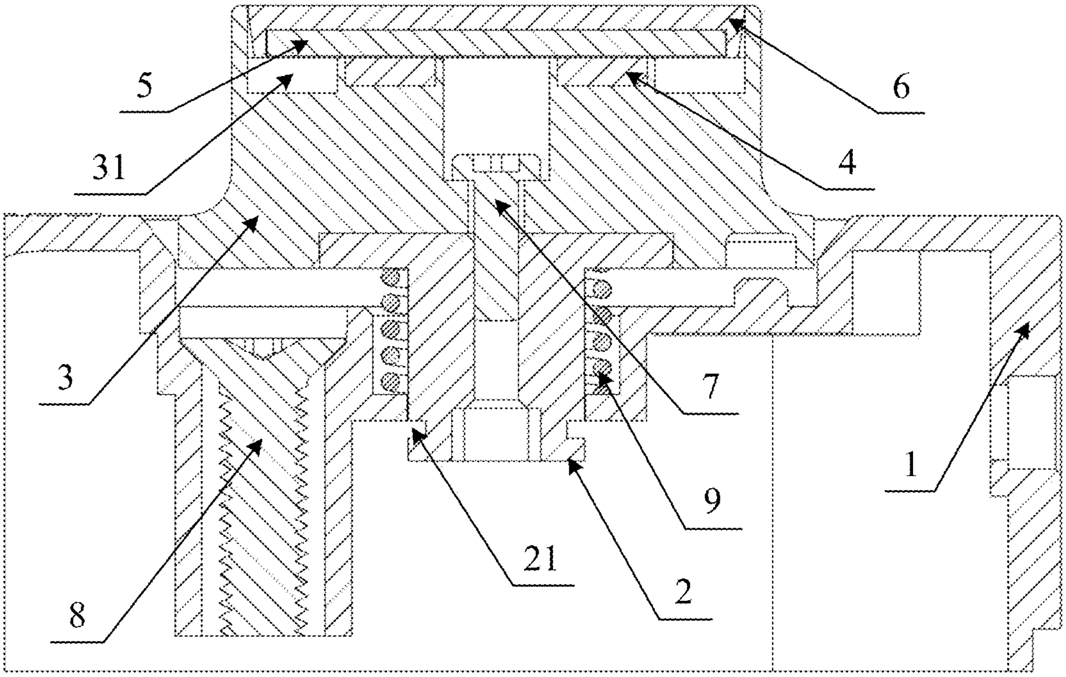
FIG. 11 is a stereo structure diagram illustrating a back locking mechanism according to some embodiments of the present disclosure.
Figure 12:
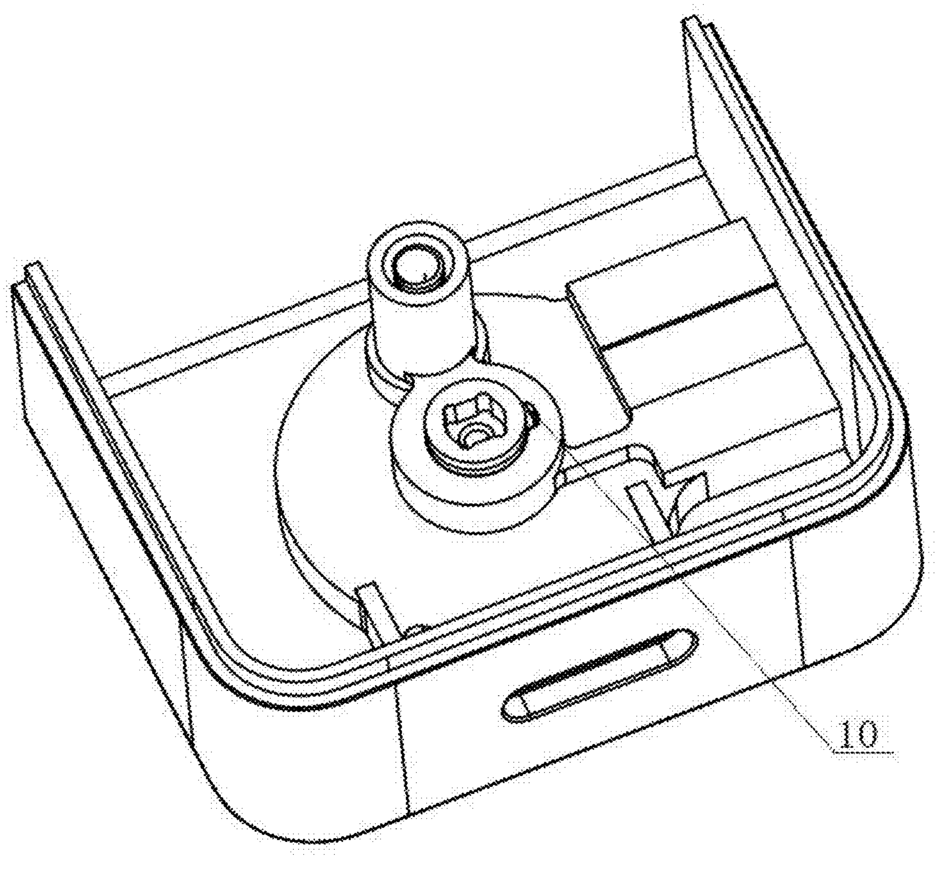
FIG. 12 is a schematic diagram of a frontal axonometric structure of a back locking knob mechanism according to some embodiments of the present disclosure.

FIG. 9 is a first structural diagram illustrating a back locking mechanism according to some embodiments of the disclosure. FIG. 10 is a second structural diagram illustrating a back locking mechanism according to some embodiments of the disclosure; FIG. 11 is a stereo structure diagram illustrating a back locking mechanism according to some embodiments of the present disclosure. As shown in FIG. 9, FIG. 10 and FIG. 11, the present disclosure also discloses an intelligent door lock. The intelligent door lock may include a main body. In some embodiments, the intelligent door lock may further include a back locking mechanism mounted inside the main body. In some embodiments, the back locking mechanism may include a back locking control board 12, a back locking detection component, and a back locking knob component.

In some embodiments, the back locking control board may be configured to receive a processing instruction or an operation request, control the back locking knob component by generating a control signal based on the processing instruction or the operation request, obtain back locking state data, and output the back locking state data.

In some embodiments, the processing instruction or the operation request may be transmitted from the server to a main control board inside the main body of the intelligent door lock via a data cable, and then transmitted to the back locking control board by the main control board. In some embodiments, the processing instruction or the operation request may be data directly received from the client terminal. In some embodiments, the back locking control board may be also configured to decrypt the processing instruction or the operation request. If the processing instruction or the operation request is decrypted successfully, an unlocking instruction, a locking instruction, or a back locking instruction may be obtained, and a corresponding control signal may be generated. In some embodiments, the operation request may include at least one of a key, control authority information of the intelligent door lock, or a random code. The back locking control board may verify whether the key, control authority information of the intelligent door lock, and/or the random code in the processing instruction or operation request are consistent with pre-stored information. In response to determining that the key, control authority information of the intelligent door lock, and/or the random code in the processing instruction or the operation request are consistent with the pre-stored information, the back locking control board may generate a corresponding control signal based on the unlocking instruction, the locking instruction, or the back locking instruction.

In some embodiments, after obtaining the back locking state data, the back locking control board may output the data to the client terminal or the server. In some embodiments, a control signal generated by the back locking control board may be sent to an electronic actuator inside the intelligent door lock, and the electronic actuator may execute the corresponding operation after receiving the signal. In some embodiments, the electronic actuator may be relatively common in intelligent door locks in the prior art and belong to the prior art. For example, the opening, close, and back lock of a door may be achieved by controlling a control circuit to receive a control signal and control a motor rotation and feedback a rotation angle, control the motor to drive the gear set to rotate, and control the gear set to drive a corresponding internal structure of the door lock (such as a lock core mechanism, a back locking knob mechanism, etc.) to operate, which is not be repeated here.

In some embodiments, the back locking detection component may include a detection switch 13 and an elastic detection arm 14. The detection switch 13 may be electronically connected to the back locking control board 12, and the elastic detection arm 14 may be configured to change state and contact the detection switch through the back locking knob component. The back locking detection component may be configured to detect the back locked state to obtain back locking state data.

In some embodiments, the back locking knob component may include a back locking knob mechanism installed on a rear panel 1 of the main body of the intelligent door lock, and a back locking knob sleeve 15 installed inside the main body of the intelligent door lock and capable of rotating synchronously with the back locking knob mechanism. The back locking knob sleeve 15 may also be provided with a cam portion 151 configured for squeezing the elastic detection arm 14 to change the state of the elastic detection arm 14. The elastic detection arm 14 may include an elastic member connected to the inside of the main body of the intelligent door lock and a roller connected to an end of the elastic member. The roller may be configured to contact the cam portion so that the elastic member changes its state and contacts the detection switch 13. The back locking knob assembly may be configured to realize back locking and can cooperate with the back locking detection component to realize back locking state detection.

In some embodiments, the back locking knob mechanism may include a back locking knob built-in part 2 and a back locking knob 3, and the structure of the back locking knob built-in part 2 and the back locking knob can refer to FIGS. 12-15. The back locking knob built-in part 2 may be rotatably installed on the rear panel 1, and the back locking knob built-in part 2 may cooperate with a corresponding structure inside the intelligent door lock to realize back locking, which is not explained here. The back locking knob 3 may be detachably installed on the back locking knob built-in part 2, and the back locking knob 3 may be used for screwing operation.

In some embodiments, the main structure of the back locking knob mechanism may include a back locking knob built-in part 2 and a back locking knob 3. The back locking knob built-in part 2 may be rotatably installed on the rear panel 1, and the back locking knob 3 may be detachably installed on the back locking knob built-in part 2. In this way, only the outside back locking knob 3 may be removed from the back locking knob built-in part 2 when the back locking knob mechanism needs to be replaced or maintained. At this time, the outside back locking knob built-in part 2 may still maintain a matching installation relationship with the rear panel 1, which simplifies the disassembly structure and disassembly operation steps. The back locking knob is easy to disassemble and can realize quick disassembly, convenient replacement, maintenance and other operations, especially for the components set behind the back locking knob (such as a lock screw hidden here). The present disclosure may have a compact structure and be especially suitable for intelligent door locks.

Figure 14:
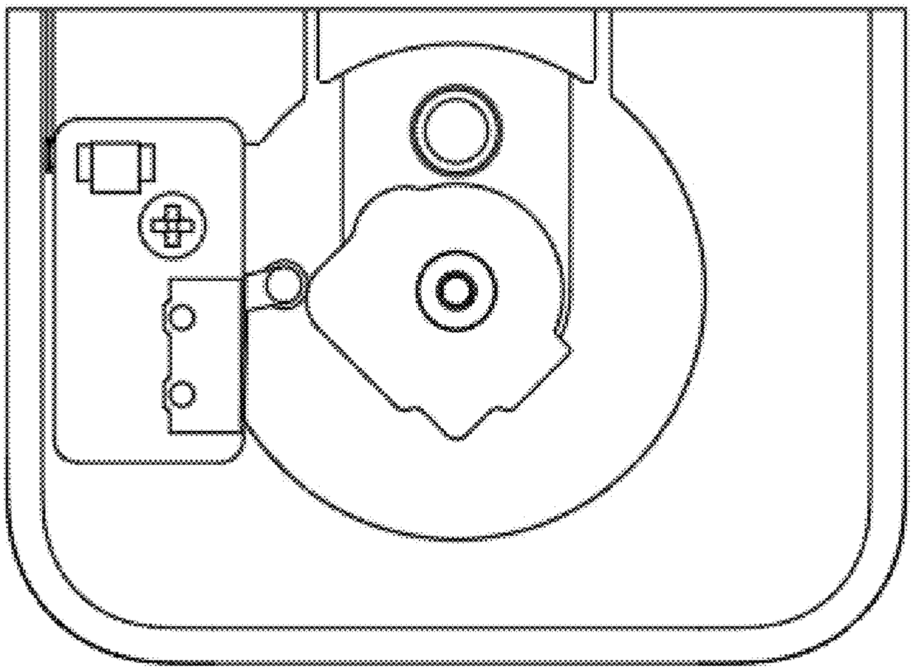
FIG. 14 is a half-sectional structural diagram illustrating a back locking knob mechanism according to some embodiments of the present disclosure.

Preferably, the rear panel 1 may be provided with an assembly hole, which is circular to match the rotation of the back locking knob built-in part 2. The part of the back locking knob built-in part 2 that penetrates into the assembly hole may have an annular circlip groove 21, which is shown in FIG. 14. The annular circlip groove 21 may be fitted with the assembly hole through a circlip, and this structure may realize a reliable limit to the back locking knob built-in part 2, while allow the back locking knob built-in part 2 to move in an axial and circumferential direction. In this way, the back locking knob built-in part 2 may be rotatably installed on the rear panel 1. Of course, other limiting forms, such as baffles may also be used to maintain the assembly relationship, which will not be repeated here.

In some embodiments, the back locking knob mechanism may further include a protection mechanism detachably installed on the back locking knob 3. The protection mechanism may cover the back locking knob 3 and a removable installation structure that matches the back locking built-in part 2 to isolate the external environment (such as dust, liquid, etc.) for protection.

In some embodiments, the installation mode of the protection mechanism may include one or more combinations of the snap fitting, screw connection, etc. Preferably, the protection mechanism may be detachably installed on the back locking knob 3 through a magnetic attraction structure, so that the structure is simple, compact, and convenient for disassembly and installation.

Figure 13:
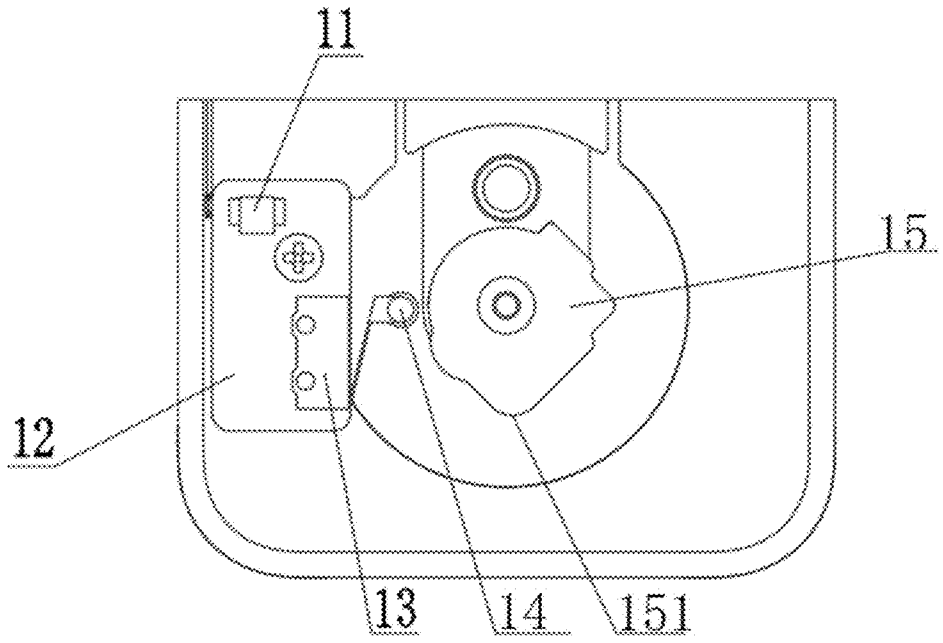
FIG. 13 is an explosive structure diagram illustrating a back locking knob mechanism according to some embodiments of the present disclosure.

Specifically, the protection mechanism may include a magnet 4, an iron sheet 5, and a decorative sheet 6, which are illustrated in FIG. 13 and FIG. 14. The iron sheet 5 may be bonded to the decorative sheet 6. The back locking knob 3 may have a groove for accommodating the iron sheet 5 and the decorative sheet 6, and the magnet 4 may be installed in the groove. The iron sheet 5 and the decorative sheet 6 may be firmly installed in the groove of the back locking knob 3 under the suction force of the magnet 4. Of course, the magnetic attraction structure of the protection mechanism may not be limiting, and other metal parts and assembling relationships can be used, which are not repeated here. Preferably, the sidewall of the decorative sheet 6 may have a tapered structure with a large upper portion and a smaller lower portion to facilitate installation and disassembly.

To further optimize the above technical solution, an opening groove 31 may be provided at the groove bottom of the groove and located at a position opposite to the edge of the decorative sheet 6. The opening groove 31 is illustrated in FIG. 13 and FIG. 14. The opening groove 31 may be configured to open the decorative sheet 6. When the back locking knob 3 needs to be removed, the edge of the decorative sheet 6 may be firmly pressed to slightly tilt the decorative sheet 6 and then the decorative sheet 6 may be removed. Specifically, the iron sheet 5 and the decorative sheet 6 may be in the shape of bars that cooperate with the back locking knob 3. Both ends of the strip-shaped groove of the back locking knob 3 may be provided with the opening groove 31, which is convenient for operation. Two symmetrical magnets 4 may be arranged in the groove.

In this embodiment, the back locking knob built-in part 2 and the back locking knob 3 may be detachably installed by a screw 7, which has a simple structure and is easy to operate. The structure of the screw is shown in FIG. 13 and FIG. 14. A connection structure of the screw 7 may be set at a rotation center of the back locking knob built-in part 2 and the back locking knob 3.

Preferably, the back locking knob built-in part 2 may be installed on the rear panel 1 by pressing. In such cases, the back locking knob 3 may be back locked only when it is pressed down. This may solve the problem that the door is accidentally back locked due to accidental touch by children or pets in the house, thereby improving the safety performance.

In some embodiments, the quick release back locking knob may include a spring 9. The back locking knob built-in part 2 may have a round shaft for the spring 9 to be sleeved and a pressing part configured to abut one end of the spring 9. The structure of the spring 9 is shown in FIGS. 13 and 14. The pressing part may be the back locking knob built-in part 2 here. The rear panel 1 may be provided with a round hole groove for accommodating the circular shaft and the spring 9, which can improve the fitting reliability. The groove bottom of the round hole groove may abut the other end of the spring 9.

Figure 15:
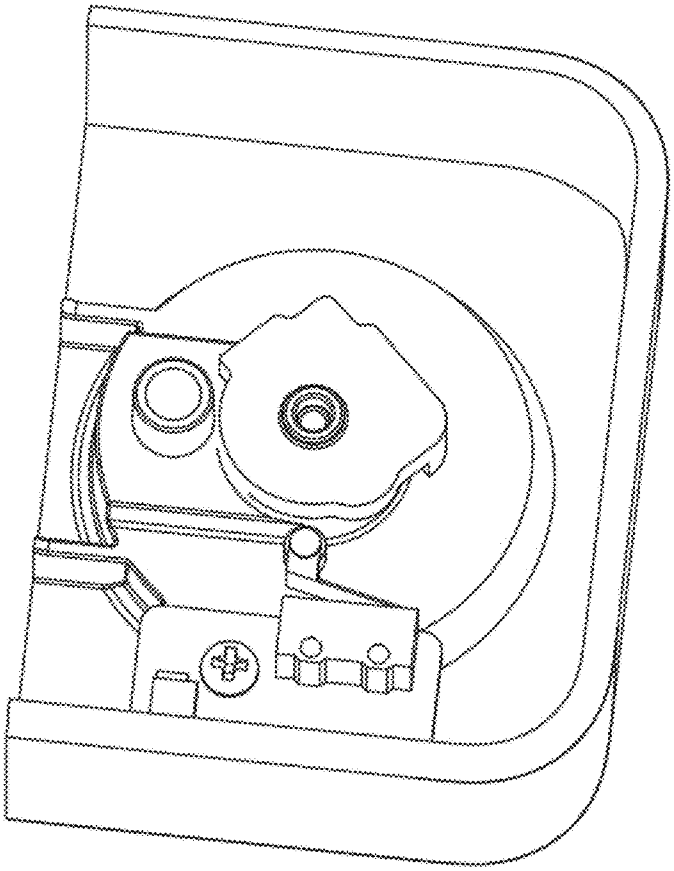
FIG. 15 is a back axonometric structure diagram illustrating a back locking knob mechanism according to some embodiments of the present disclosure.

In some embodiments, the groove bottom of the round hole groove may be provided with a gap 10, and the structure of the gap 10 can refer to FIG. 15. In some embodiments, a circumferential surface (that is, the sleeve 15 of the back locking knob) of the round shaft of the back locking knob built-in part may also be provided with a bump 11, and the structure of the bump 11 can refer to FIGS. 13 and 15. The bump 11 may be configured to be snapped into the gap 10 to limit the rotation of the back locking knob built-in part, so as to realize the back locking function of the intelligent door lock. When the back locking knob 3 is pressed, the bump 11 may move axially out of the gap 10 and move inside the door lock, and the back locking knob 3 may be rotated again to achieve unlocking. At the same time, the bump 11 may be stuck at an outer end surface of the round hole groove under the action of the spring 9, and the back locking knob built-in part 2 may be positioned on the rear panel 1. When the door lock needs to be back locked again, the back locking knob 3 may need to be squeezed to separate the bump 11 from the outer end surface of the round hole groove after compressing the spring 9, and then the back locking knob 3 may be rotated until the bump 11 is locked into the gap 10 to realize back locking.

In some embodiments, the back panel 1 may be provided with a back locking control board 12. The back locking control board may be provided with a bump 11 and a detection switch 13, and the detection switch 13 may be provided with an elastic detection arm 14. The structure of the back locking control board 12 can refer to FIG. 9, FIG. 10, and FIG. 11. When the back locking knob 3 rotates, the back locking knob sleeve 15 may be driven to rotate. A cam portion 151 on the back locking knob sleeve 15 may be configured to press the elastic detection arm 14 on the detection switch 13, so as to realize a detection trigger of the back locking knob 3. The back locking control board 12 may be directly connected to the internal main board of the intelligent door lock through a bump 11 through a connecting line, and the current state of the intelligent door lock may be sent to the client terminal and/or the server. When the user triggers the detection switch on the client terminal, the intelligent door lock may use the detection switch 13 to detect whether a fingerprint or password keyboard on the outer panel is in a shielded or power-off state. If the detection switch 13 detects that the cam portion 151 is pressed on the detection switch 13 through the elastic detection arm 14, it may be determined that the door lock is in a back locked state, and the door cannot be opened or closed outdoors. If the detection switch 13 detects that the cam portion 151 is not pressed on the detection switch 13 through the elastic detection arm 14, it may be determined that the door lock is not in a back locked state, and the user can back lock the door lock by triggering the door lock through the client terminal.

The rear panel of existing door locks may generally hide a lock screw hole through a special structural design. Since there is a large space behind the back locking knob, the lock screw hole may be disposed behind the knob. In the present disclosure, the rear panel 1 may be provided with a lock screw hole, and a projection of the locking knob built-in part 2 on the rear panel 1 may not block the lock screw hole, that is, the locking knob built-in part 2 installed on the rear panel 1 may not block a disassembling operation of the lock screw 8. The projection of the locking knob 3 installed in the locking knob built-in part 2 on the rear panel 1 may block the lock screw hole, that is, the lock screw on the front panel and the rear panel are hidden under the locking knob 3, thereby making the structure compact and the interface concise, and beautifying the rear panel 1.

Preferably, the rear panel 1 may be provided with a groove that cooperates with the back locking knob 3 to facilitate rotation and pressing actions of the back locking knob 3.

The following part describes the back locking knob mechanism in conjunction with specific embodiments:

The back locking knob mechanism may be installed as follows: 1) set the spring 9 on a round shaft of the back locking knob built-in part 2, install the spring 9 and the back locking built-in part 2 in the round hole groove of the rear panel 1, and then use a circlip to lock the back locking knob built-in part 2 on the rear panel 1; 2) install the rear panel 1 on the door through the lock screw 8 on the front panel and the rear panel; 3) install the magnet 4 on the back locking knob 3, and then lock the back locking knob 3 on the back locking knob built-in part 2 with the screw 7; 4) stick the iron sheet 5 on the decorative sheet 6, and then suck the decorative sheet 6 into the groove of the back locking knob 3. The opening groove 31 may be configured to open the decorative sheet 6. When the back locking knob 3 needs to be removed, an edge of the decorative sheet 6 may be pressed firmly to slightly tilt the decorative sheet 6 to remove the decorative sheet 6. Then, a screwdriver may be used to remove the screw 7 so as to remove the back locking knob.

Figure 16:
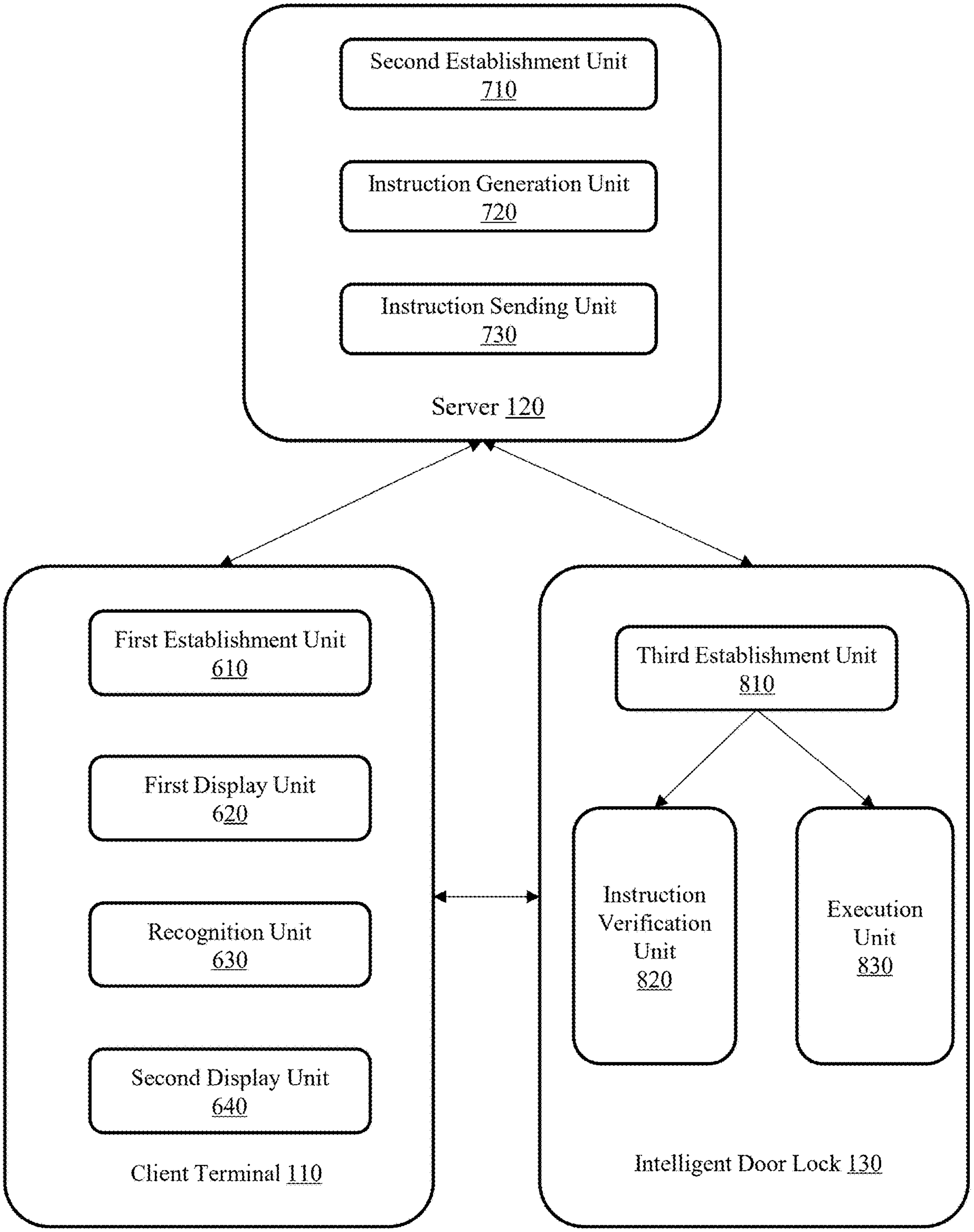
FIG. 16 is a structural diagram illustrating another intelligent door lock system according to some embodiments of the present disclosure.

FIG. 16 is a structural diagram illustrating another intelligent door lock system according to some embodiments of the present disclosure. As shown in FIG. 16, the intelligent door lock system may include a client terminal 140, a server 110, and an intelligent door lock 130 described above.

The intelligent door lock system provided in the present invention may receive an operation instruction from a user at the client terminal, obtain a recognition result by recognizing the operation instruction, and send the recognition result to the intelligent door lock or the server. The intelligent door lock may reach a target state based on the recognition result, and response information of the intelligent door lock state may be displayed on the client terminal. In this way, the user can control the intelligent door lock via the client terminal, and obtain a real-time state of the intelligent door lock through the client terminal when the user changes the state of the intelligent door lock, which improves the user experience.

In some embodiments, the client terminal 140 may include a processor and a storage device, and the above-mentioned first establishment unit 610, the first display unit 620, the detection unit 630, and the recognition unit 640 may all be stored as program units in the storage device. The processor may execute the above program units stored in the storage device to realize the corresponding function.

In some embodiments, the server 110 may include a processor and a storage device. The above-mentioned second establishment unit 710, the instruction generation unit 720, and the instruction sending unit 730 may all be stored as program units in the storage device. The processor may execute the above program units stored in the storage device to realize the corresponding function.

In some embodiments, the intelligent door lock may include a processor and a storage device. The above-mentioned third establishment unit 810, the instruction verification unit 820, and the execution unit 830 may all be stored as program units in the storage device. The processor may execute the above program units stored in the storage device to realize the corresponding functions.

In some embodiments, a processor may include a core, and the core may retrieve the corresponding program units from a storage device. The count of cores may be one or more, and the user experience can be improved by adjusting core parameters.

In some embodiments, a storage device may include a non-permanent memory in a computer-readable medium, a random access memory (RAM) and/or a non-volatile memory, such as a read-only memory (ROM) or a flash memory (flash RAM). The storage device may include at least one memory chip.

The possible beneficial effects of the embodiments of the present application may include but are not limited to: (1) when the user enters verification information on an operation panel of the intelligent door lock, the user can perceive an unlocking process in time when encountering interference or interruption; (2) it is convenient to disassemble the back locking knob, so as to take out the locking screw(s) on the front panel and the rear panel; at the same time, it is better to hide the locking screw(s) on the front panel and the rear panel under the knob; (3) using a push-type back locking knob can prevent the door from being backed locked by an accidental touch of children or pets at home, and improve safety. It should be noted that different embodiments may have different beneficial effects. The possible beneficial effects of an embodiment may be any one or a combination of the above mentioned beneficial effects or any other beneficial effects.

The basic concepts have been described above. Obviously, for those skilled in the art, the above detailed disclosure is only an example, and does not constitute a limitation to the application. Although it is not explicitly stated here, those skilled in the art may make various modifications, improvements and amendments to this application. Such modifications, improvements, and corrections are suggested in this application, so such modifications, improvements, and corrections still belong to the spirit and scope of the exemplary embodiments of this application.

At the same time, certain terminology has been used to describe embodiments of the present disclosure. For example, the terms “one embodiment”, “an embodiment”, and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed:

1. An intelligent door lock including a main body and a back locking mechanism mounted inside the main body, wherein the back locking mechanism includes:

a back locking control board configured to receive a processing instruction or an operation request, control a back locking knob component by generating a control signal based on the processing instruction or the operation request, obtain back locking state data, and output the back locking state data;

a back locking detection component configured to obtain the back locking state data by detecting a back locking state;

the back locking knob component configured to realize back locking and operate with the back locking detection component to realize back locking state detection;

wherein the back locking detection component includes a detection switch and an elastic detection arm, the detection switch is electronically connected to the back locking control board, and the elastic detection arm is configured to change state and contact the detection switch through the back locking knob component;

wherein the back locking knob component includes:

a back locking knob mechanism installed on a rear panel of the main body of the intelligent door lock, and a back locking knob sleeve installed inside the main body of the intelligent door lock and capable of rotating synchronously with the back locking knob mechanism, the back locking knob sleeve being provided with a cam portion for squeezing the elastic detection arm and changing the state of the elastic detection arm.

2. The intelligent door lock of claim 1, wherein the elastic detection arm includes:

an elastic member connected to an inside of the main body of the intelligent door lock; and a roller connected to an end of the elastic member, wherein the roller is configured to contact the cam portion so that the elastic member changes its state and contacts the detection switch.

3. The intelligent door lock of claim 1, wherein the back locking knob mechanism includes a back locking knob built-in part and a back locking knob, the back locking knob built-in part is rotatably installed on the rear panel, the back locking knob is detachably installed on the back locking knob built-in part, and the back locking knob sleeve is connected to the back locking knob built-in part.

4. The intelligent door lock of claim 3, further comprising a protection mechanism detachably installed on the back locking knob, the protection mechanism covering the back locking knob and a removable installation structure that matches the back locking knob built-in part.

5. The intelligent door lock of claim 4, wherein the protection mechanism includes a magnet, an iron sheet, and a decorative sheet, the iron sheet is bonded to the decorative sheet, the back locking knob has a groove for accommodating the iron sheet and the decorative sheet, and the magnet is installed in the groove.

6. The intelligent door lock of claim 5, wherein an opening groove is provided at a groove bottom of the groove and located at a position opposite to the edge of the decorative sheet, the opening groove provides space for the decorative sheet to tilt after the edge of the decorative sheet is pressed such that the decorative sheet is able to be removed.

7. The intelligent door lock of claim 3, wherein the back locking knob built-in part is squeezable and installed on the rear panel.

8. The intelligent door lock of claim 7, wherein the intelligent door lock further comprises a spring, the back locking knob built-in part has a round shaft for the spring to be sleeved and a pressing part configured to abut one end of the spring, the rear panel is provided with a round hole groove for accommodating the round shaft and the spring, and the groove bottom of the round hole groove abuts the other end of the spring.

9. The intelligent door lock of claim 8, wherein the groove bottom of the round hole groove is provided with a gap, a circumferential surface of the round shaft of the back locking knob built-in part is provided with a bump, and the bump is configured to be snapped into the gap to limit the rotation of the back locking knob built-in part.

10. The intelligent door lock of claim 5, wherein the rear panel includes an assembly hole configured to install the back locking knob built-in part, a part of the back locking knob built-in part that penetrates into the assembly hole includes an annular circlip groove, the annular circlip groove fits with the assembly hole through a circlip.

11. A method for controlling an intelligent door lock, implemented by a back locking mechanism of the intelligent door lock, comprising:

receiving a processing instruction or an operation request;

controlling a back locking knob component of the intelligent door lock by generating a control signal based on the processing instruction or the operation request;

obtaining back locking state data from a back locking detection component of the intelligent door lock; and outputting the back locking state data, wherein the back locking mechanism includes a back locking control board, the back locking detection component, and the back locking knob component, wherein the back locking detection component includes a detection switch and an elastic detection arm, the detection switch is electronically connected to the back locking control board, and the elastic detection arm is configured to change state and contact the detection switch through the back locking knob component, and wherein the back locking knob component includes:

a back locking knob mechanism installed on a rear panel of a main body of the intelligent door lock, and a back locking knob sleeve installed inside the main body of the intelligent door lock and capable of rotating synchronously with the back locking knob mechanism, the back locking knob sleeve being provided with a cam portion for squeezing the elastic detection arm and changing the state of the elastic detection arm.

12. The method of claim 11, wherein the elastic detection arm includes:

an elastic member connected to an inside of the main body of the intelligent door lock; and a roller connected to an end of the elastic member, wherein the roller is configured to contact the cam portion so that the elastic member changes its state and contacts the detection switch.

13. The method of claim 11, wherein the back locking knob mechanism includes a back locking knob built-in part and a back locking knob, the back locking knob built-in part is rotatably installed on the rear panel, the back locking knob is detachably installed on the back locking knob built-in part, and the back locking knob sleeve is connected to the back locking knob built-in part.

14. The method of claim 13, wherein the intelligent door lock further comprises a protection mechanism detachably installed on the back locking knob, the protection mechanism covering the back locking knob and a removable installation structure that matches the back locking knob built-in part.

15. The method of claim 14, wherein the protection mechanism includes a magnet, an iron sheet, and a decorative sheet, the iron sheet is bonded to the decorative sheet, the back locking knob has a groove for accommodating the iron sheet and the decorative sheet, and the magnet is installed in the groove.

16. The method of claim 13, wherein the back locking knob built-in part is squeezable and installed on the rear panel.

* * * * *